(12) United States Patent
Ye et al.

(10) Patent No.: US 11,624,801 B2
(45) Date of Patent: Apr. 11, 2023

(54) METHOD AND SYSTEM FOR DETERMINING THE LOCATION OF AN OBJECT BASED ON TIME DIFFERENCE OF ARRIVAL (TDOA) AND ANGLE OF ARRIVAL (AOA)

(71) Applicant: Red Point Positioning Corporation, Boston, MA (US)

(72) Inventors: Zhenzhen Ye, Westford, MA (US); Chunjie Duan, Brookline, MA (US)

(73) Assignee: Red Point Positioning Corporation, Boston, MA (US)

( * ) Notice: Subject to any disclaimer, the term of this patent is extended or adjusted under 35 U.S.C. 154(b) by 248 days.

(21) Appl. No.: 17/219,037

(22) Filed: Mar. 31, 2021

(65) Prior Publication Data
US 2022/0317235 A1 Oct. 6, 2022

(51) Int. Cl.
*G01S 5/02* (2010.01)
*G01S 5/04* (2006.01)
*G01S 5/06* (2006.01)
*H04W 64/00* (2009.01)
*G01S 5/00* (2006.01)

(52) U.S. Cl.
CPC ........ *G01S 5/0268* (2013.01); *G01S 5/02213* (2020.05); *G01S 5/04* (2013.01); *G01S 5/06* (2013.01); *H04W 64/00* (2013.01)

(58) Field of Classification Search
None
See application file for complete search history.

(56) References Cited

U.S. PATENT DOCUMENTS

| 6,233,459 B1* | 5/2001 | Sullivan | G01S 5/12 455/456.2 |
| 8,063,825 B1* | 11/2011 | Yang | G01S 5/0072 342/458 |
| 8,188,923 B2 | 5/2012 | Ferreol et al. | |
| 8,543,132 B2 | 9/2013 | Nam et al. | |
| 9,823,330 B2* | 11/2017 | Hart | H04W 64/006 |
| 10,408,917 B2 | 9/2019 | Ye et al. | |
| 2004/0072579 A1* | 4/2004 | Hottinen | G01S 5/0226 370/320 |

(Continued)

OTHER PUBLICATIONS

A. Kumar et al, "Wireless Networking"; chapter 10; published by Elsevier Inc.; Amsterdam, The Netherlands; year 2008; ISBN 978-0-12-374254-4. (Year: 2008).*

*Primary Examiner* — Bernarr E Gregory
(74) *Attorney, Agent, or Firm* — Guntin & Gust, PLC; Kenneth Kwan

(57) ABSTRACT

Aspects of the subject disclosure may include, for example, receiving, from a first antenna and a second antenna of a mobile device, a first wireless signal transmitted by a first anchor of a pair of anchors, receiving, from the first antenna and the second antenna, a second wireless signal that is transmitted by a second anchor of the pair of anchors based upon the second anchor detecting the first wireless signal, determining time difference of arrival information based on the receiving the first wireless signal and the second wireless signal, determining angle of arrival information based on the receiving the first wireless signal and the second wireless signal, and estimating a location of the mobile device based on the time difference of arrival information and the angle of arrival information. Other embodiments are disclosed.

20 Claims, 21 Drawing Sheets

(56) References Cited

U.S. PATENT DOCUMENTS

| | | | |
|---|---|---|---|
| 2011/0074569 A1* | 3/2011 | Alsindi | G01S 5/0289 |
| | | | 340/539.1 |
| 2014/0241175 A1* | 8/2014 | Schell | H04W 4/023 |
| | | | 370/252 |
| 2015/0156746 A1 | 6/2015 | Horne et al. | |
| 2015/0185309 A1* | 7/2015 | Pu | H04W 64/003 |
| | | | 455/456.1 |
| 2016/0327628 A1* | 11/2016 | Perez-Cruz | G01S 5/0278 |
| 2017/0082727 A1* | 3/2017 | Sendonaris | H04W 64/00 |
| 2019/0195981 A1* | 6/2019 | Ding | G01S 5/04 |
| 2019/0373575 A1* | 12/2019 | Kurras | G01S 5/0268 |
| 2022/0066010 A1* | 3/2022 | Henry | G01S 5/0236 |
| 2022/0070612 A1* | 3/2022 | Henry | G01S 5/0278 |
| 2022/0236404 A1* | 7/2022 | Gunnarsson | H04W 64/00 |
| 2022/0248366 A1* | 8/2022 | Bao | H04W 64/00 |

\* cited by examiner

700

θ: azimuth angle
φ: elevation angle

900

METHOD AND SYSTEM FOR DETERMINING THE LOCATION OF AN OBJECT BASED ON TIME DIFFERENCE OF ARRIVAL (TDOA) AND ANGLE OF ARRIVAL (AOA)

FIELD OF THE DISCLOSURE

The subject disclosure relates to a method and system for determining the location of an object based on time difference of arrival (TDOA) and angle of arrival (AOA).

BACKGROUND

Determining location information between objects can serve multiple purposes such as predicting and mitigating collisions between objects, tracking distances between objects, enforcing distancing between objects, inventory management, or combinations thereof. Objects can include people, mobile machinery such as forklifts and robots, vehicles controlled by individuals or driverless, or other objects for which location management and/or tracking may be desirable. Location information can correspond to distances between objects, relative positions of objects, trajectory of objects, speed of objects, or combinations thereof.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for determining location information between a mobile tag and one or more anchors. Other embodiments are described in the subject disclosure.

Figure 1:
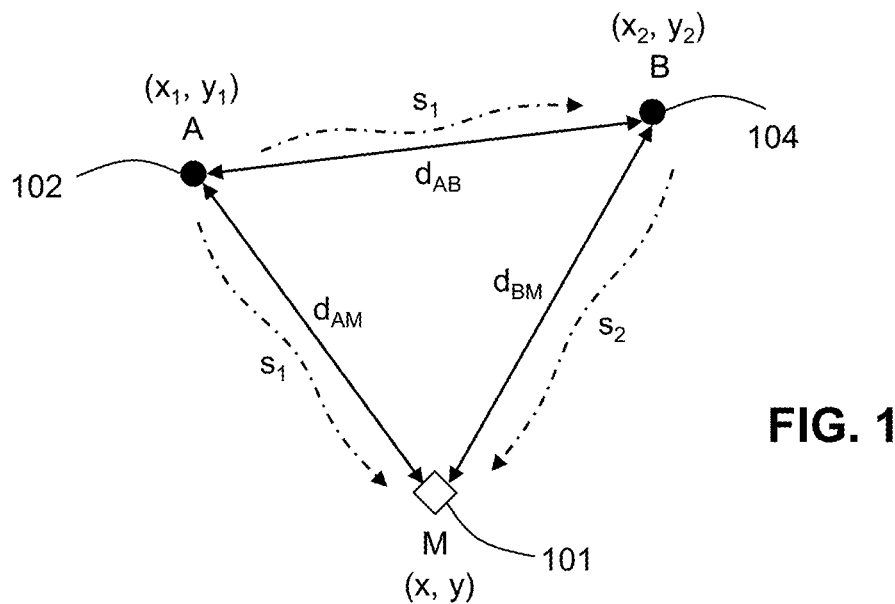
FIG. 1 is a block diagram illustrating an exemplary, non-limiting embodiment of a mobile tag and anchors for determining location information between the mobile tag and the anchors in accordance with various aspects described herein.
Figure 2:
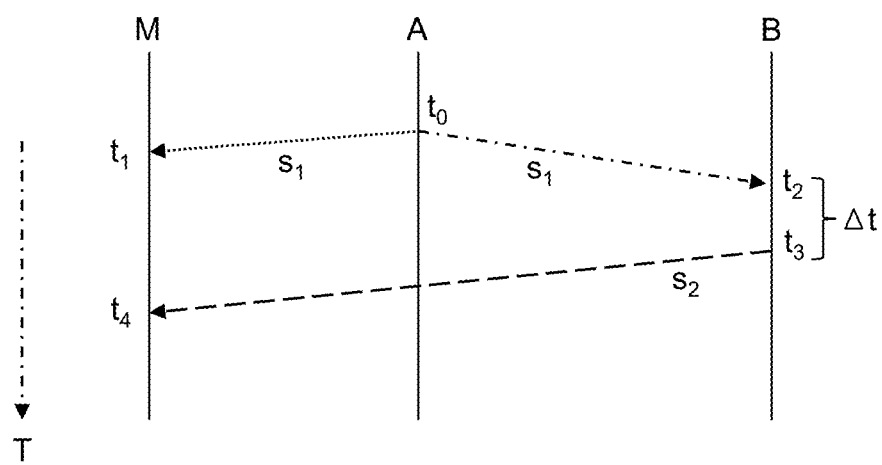
FIG. 2 is a block diagram illustrating an exemplary, non-limiting embodiment of a timing diagram for determining location information between the mobile tag and the anchors of FIG. 1 in accordance with various aspects described herein.

FIG. 1 is a block diagram illustrating an exemplary, non-limiting embodiment of a mobile tag 101 and anchors 102 ("A") and 104 ("B") for determining location information between the mobile tag 101 ("M") and the anchors 102 and 104 in accordance with various aspects described herein. In an embodiment, anchor 102 can be configured to transmit a first wireless signal ($s_1$) that can be received by anchor 104 and the mobile tag 101. The timing of transmission by anchor 102 and reception by the mobile tag 101 and anchor 104 of the first wireless signal ($s_1$) is depicted in FIG. 2.

In an embodiment, anchor 102 transmits the first wireless signal ($s_1$) at time $t_0$, which in turn is received by the mobile tag 101 at time $t_1$ and anchor 104 at time $t_2$. Anchor 104 can be configured to transmit a second wireless signal ($s_2$) at time $t_3$, which is received by the mobile tag 101 at time $t_4$. The mobile tag 101 can be configured to use a time difference of arrival (TDOA) measurement technique based on the first and second wireless signals ($s_1$, $s_2$) to determine location information between the mobile tag 101 and the anchors 102 and 104 as will be described below.

In an embodiment, anchors 102 and 104 are stationary. Accordingly, their x-y coordinates and the distance between anchors 102 and 104 ($d_{AB}$) can be made known to the mobile tag 101 either by a look-up table provisioned into a memory of the mobile tag 101 or by including such information in the first wireless signal ($s_1$), which can then be obtained by the mobile tag 101. Additionally, the mobile tag 101 can be configured to include in its look-up table the receive time and transmit time ($t_2$, $t_3$) of anchor 104 and/or a time difference between these times ($\Delta t = t_3 - t_2$), or can receive this information in the second wireless signal ($s_2$) transmitted by anchor 104. The equations that follow can be used to calculate a first possible location of the mobile tag 101 relative to anchor pair 102, 104.

The distance between anchor 102 and the mobile tag can be represented as, $$d_{AM} = c(t_1 - t_0) \quad \text{(EQ 1)},$$

where c is the speed of light constant. Similarly, the distance from anchor 102 to anchor 104 can be represented as, $$d_{AB} = c(t_2 - t_0) \quad \text{(EQ 2)}.$$

Additionally, the distance from anchor 104 to the mobile tag 101 can be represented as, $$d_{BM} = c(t_4 - t_3) \quad \text{(EQ 3)}.$$

The total distance traveled by the first wireless signal ($s_1$) from anchor 102 to anchor 104 and the second wireless signals ($s_2$) from anchor 104 to mobile tag 101 can be represented as, $$d_{AB} + d_{BM} = c(t_2 - t_0 + t_4 - t_3) \quad \text{(EQ 4A)}.$$

To eliminate variable $t_0$, equation EQ1 can be subtracted from equation EQ 4A, resulting in, $$d_{AB} + d_{BM} - d_{AM} = c(t_2 - t_1 + t_4 - t_3) \quad \text{(EQ 4B)}.$$

Substituting $\Delta t = t_3 - t_2$ into EQ 4B results in equation, $$d_{AB} + d_{BM} - d_{AM} = c(t_4 - t_1 - \Delta t) \quad \text{(EQ 4C)}.$$

Since $d_{AB}$ is a constant known to the mobile tag 101 and the time variables of the factor $c(t_4 - t_1 - \Delta t)$ are also known to the mobile tag 101, EQ 4C can be rewritten as, $$d_{BM} - d_{AM} = \Delta d_1 \quad \text{(EQ 5)},$$

where $\Delta d_1 = c(t_4 - t_1 - \Delta t) - d_{AB}$, which are constants known to mobile tag 101. Furthermore, in an example of two-dimensional (2D) space, the distance between anchor 102 and the mobile tag 101 can be represented as, $$d_{AM} = \sqrt{(x-x_1)^2 + (y-y_1)^2},$$

and the distance between anchor 104 and the mobile tag 101 can be represented as, $$d_{BM} = \sqrt{(x-x_2)^2 + (y-y_2)^2}.$$

Substituting $d_{AM}$ and $d_{BM}$ in EQ 5 results in the following equation, $$\sqrt{(x-x_2)^2 + (y-y_2)^2} - \sqrt{(x-x_1)^2 + (y-y_1)^2} = \Delta d_1 \quad \text{(EQ 6)}.$$

Figure 3:
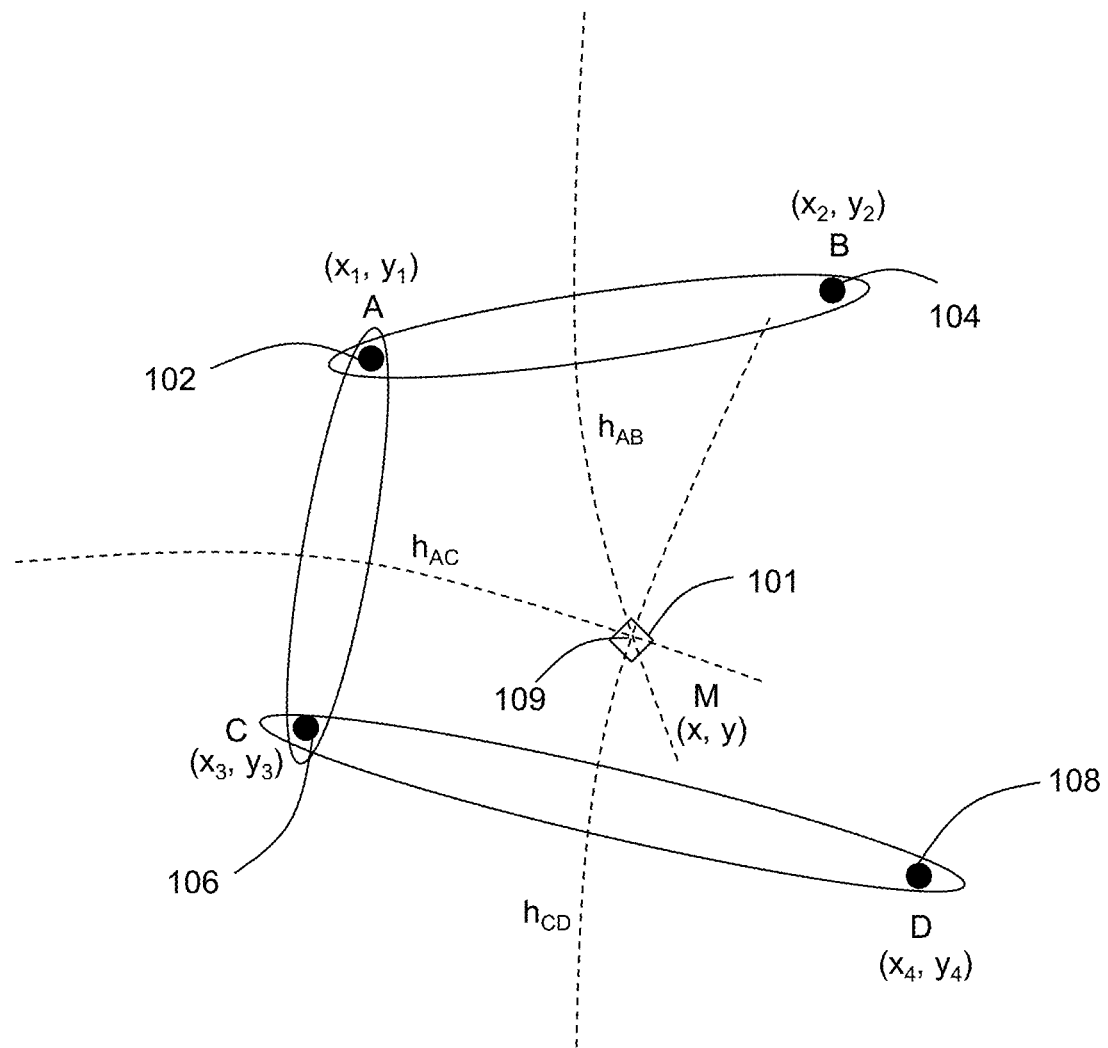
FIG. 3 is a block diagram illustrating an exemplary, non-limiting embodiment for determining location information between the mobile tag and pairs of anchors in accordance with various aspects described herein.

Equation EQ 6 has only two unknown variables (x, y) that can be solved by the mobile tag 101 utilizing a non-linear regression technique (e.g., Nonlinear Least Squares). Such a technique produces a hyperbolic curve of solutions for x and y that is associated with the positions of anchors 102 and 104. Such a hyperbolic curve can be represented as, $$h_{AB} = \Delta d_1 \quad \text{(EQ 7A)},$$

where $h_{AB} = \sqrt{(x-x_2)^2 + (y-y_2)^2} - \sqrt{(x-x_1)^2 + (y-y_1)^2}$. The mobile tag 101 can be further configured to perform the above calculation across other anchor pairs as depicted in FIG. 3. For example, the mobile tag 101 can be configured to determine a hyperbolic curve between anchors 102 and 106 (i.e., anchors A and C) resulting in equation, $$h_{AC} = \Delta d_2 \quad \text{(EQ 7B)},$$

where $\Delta d_2$ is a constant known to mobile tag 101, and where $h_{AC} = \sqrt{(x-x_3)^2 + (y-y_3)^2} - \sqrt{(x-x_1)^2 + (y-y_1)^2}$. Additionally, the mobile tag 101 can be configured to determine a hyperbolic curve between anchors 106 and 108 (i.e., anchors C and D) resulting in equation, $$h_{CD} = \Delta d_3 \quad \text{(EQ 7C)},$$

where $\Delta d_3$ is a constant known to mobile tag 101, and where $h_{CD} = \sqrt{(x-x_4)^2 + (y-y_4)^2} - \sqrt{(x-x_3)^2 + (y-y_3)^2}$. The intersection 109 of hyperbolic curves $h_{AB}$, $h_{AC}$ and $h_{CD}$ corresponding to equations EQ 7A-7C can provide a two-dimensional coordinate location (i.e., x, y) for the mobile tag 101 relative to anchor pairs 102 and 104 (anchors A/B), 102 and 106 (anchors A/C), and 106 and 108 (anchors C/D). It will be appreciated that the mobile tag 101 can also be configured to determine a three-dimensional coordinate (i.e., x, y, z) of its location by utilizing a fourth pair of anchors.

To enable the above calculations, the pairs of anchors utilized by the mobile tag 101 must satisfy a coverage area that encompasses the anchor pairs and the mobile tag 101. For example, referring to FIG. 4A, the coverage area of anchor 102 (anchor "A") is defined by reference 110, while the coverage area of anchor 104 (anchor "B") is defined by reference 112. The overlapping region 114 represents the coverage area that is jointly shared by anchors 102 and 104. Since anchor 104 and the mobile tag 101 must be able to receive the first wireless signal ($s_1$) generated by anchor 102, anchor 104 and the mobile tag 101 must be located in the overlapping region 114. Additionally, the mobile tag 101 must be in the overlapping region 114 in order to receive the second wireless signal ($s_2$) generated by anchor 104. Conditions such as described above for anchor pairs 102, 104 (anchors A/B) must also be satisfied by the other anchor pairs 102, 106 (anchors A/C) and anchor pairs 106, 108 (anchors C/D) in order to enable the mobile tag 101 to perform the triangulation calculations described above for hyperbolic curves $h_{AB}$, $h_{AC}$ and $h_{CD}$.

Figure 4A:
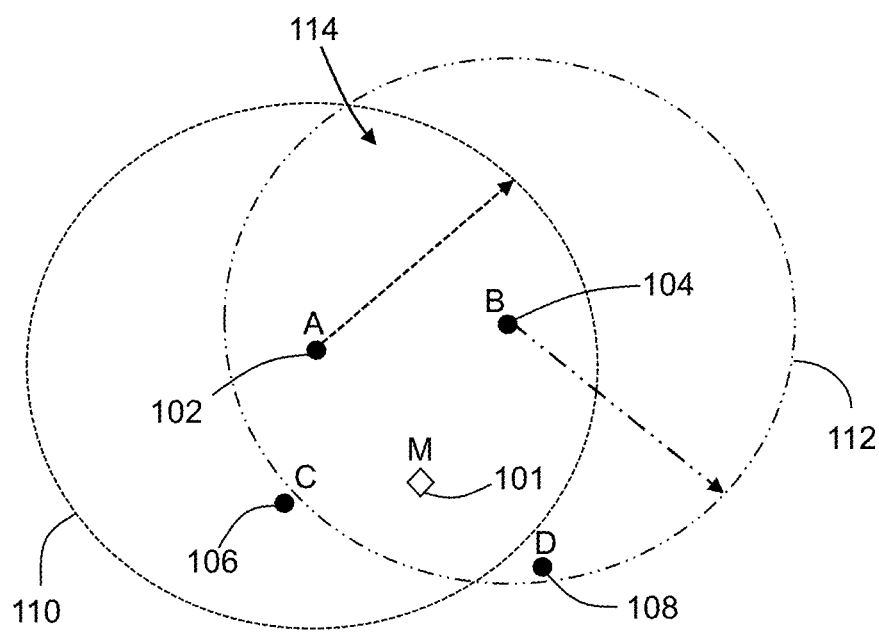
FIGS. 4A, 4B and 4C are block diagrams illustrating exemplary, non-limiting embodiments for selecting pairs of anchors in accordance with various aspects described herein.
Figure 4B:
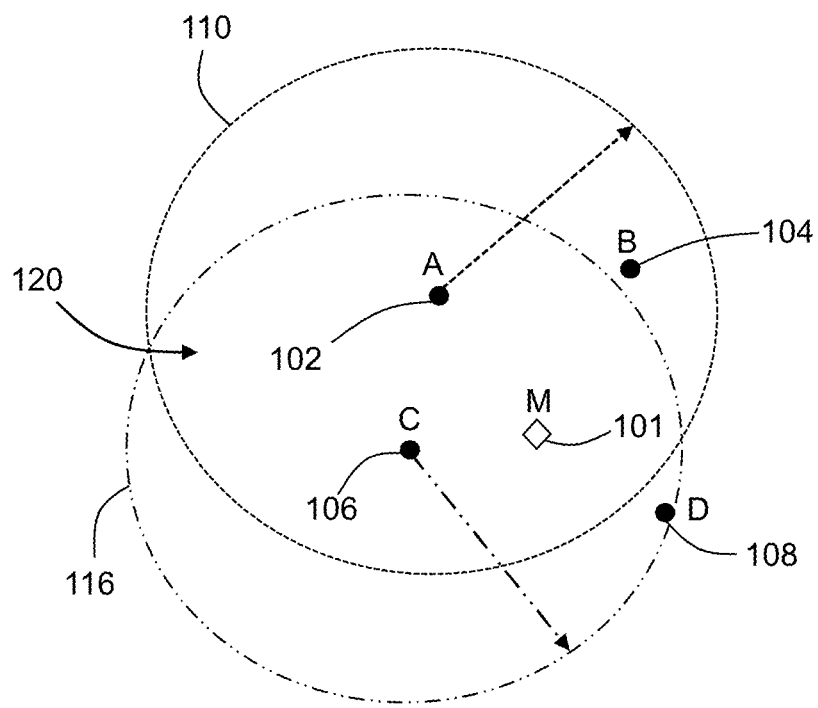
Figure 4C:
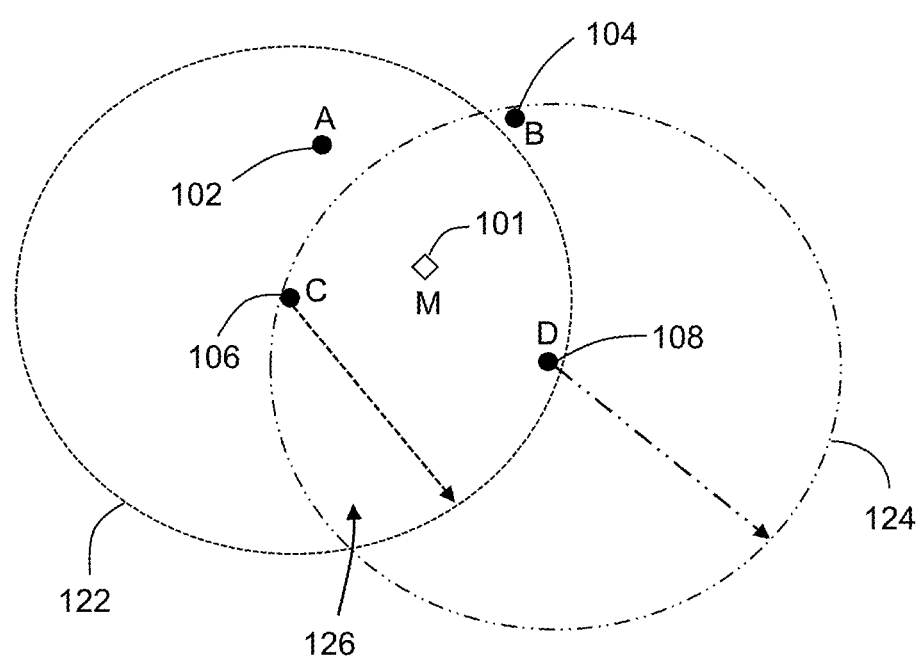

FIG. 4B shows that the coverage areas 110 and 116 of anchor pair 102, 106 (anchors A/C) create an overlapping region 120 that encompasses anchors 102 and 106 and the mobile tag 101, thereby enabling the mobile tag 101 to calculate hyperbolic curve $h_{AC}$. Additionally, FIG. 4C shows that the coverage areas 122 and 124 of anchor pair 106, 108 (anchors C/D) create an overlapping region 126 that encompasses anchors 106 and 108 and the mobile tag 101, thereby enabling the mobile tag 101 to calculate hyperbolic curve $h_{CD}$.

Figure 5:
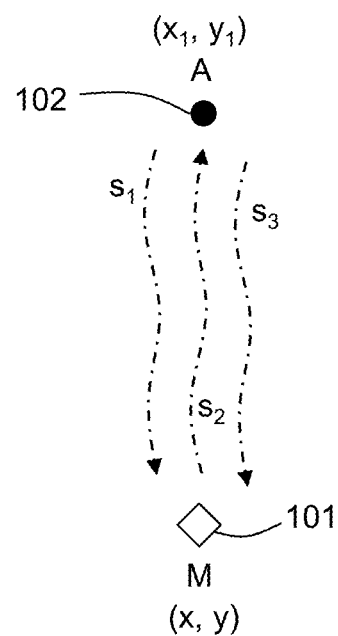
FIG. 5 is a block diagram illustrating an exemplary, non-limiting embodiment of a mobile tag and an anchor for determining location information between the mobile tag and the anchor in accordance with various aspects described herein.
Figure 6:
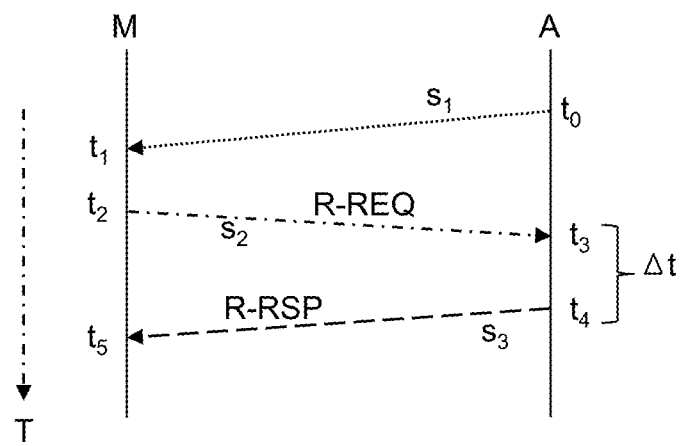
FIG. 6 is a block diagram illustrating an exemplary, non-limiting embodiment of a timing diagram for determining location information between the mobile tag and the anchor of FIG. 5 in accordance with various aspects described herein.

FIG. 5 depicts another embodiment for determining location information between the mobile tag 101 and an anchor 102. In this embodiment, the mobile tag 101 can be configured to use a two-way time of arrival (TW-TOA) process for determining a distance between itself and the anchor 102. Optionally, and as depicted in FIG. 6, the process may begin at anchor 102 which transmits a first wireless signal ($s_1$), which is received at time $t_1$. Wireless signal ($s_1$) can include the x-y coordinates ($x_1$, $y_1$) of anchor 102. Upon receiving the first wireless signal ($s_1$), the mobile tag 101 can be configured to transmit a second wireless signal ($s_2$), which can represent a range request (R-REQ) signal directed to anchor 102 initiated at time $t_2$ and received by anchor 102 at time $t_3$.

Upon receiving the R-REQ signal at time $t_3$, the anchor 102 can process the R-REQ signal and initiate at time $t_4$ a transmission of a third wireless signal ($s_3$) representing a range response (R-RSP) signal that is received by the mobile tag 101 at time $t_5$. The time to process the R-REQ signal and transmit the R-RSP signal can be represented by $\Delta t = t_4 - t_3$, which can be communicated to the mobile tag 101 via the third wireless signal ($s_3$).

The mobile tag 101 can be configured to determine a roundtrip distance based on the formula, $$d_{r\text{-}trip} = d_{AM} + d_{MA} \quad \text{(EQ 8)},$$

where $d_{r\text{-}trip}$ is the roundtrip distance from the mobile tag 101 to anchor 102 and back to mobile tag 101, $d_{MA}$ is the distance from the mobile tag 101 to anchor 102, and $d_{AM}$ is the distance from anchor 102 to the mobile tag 101. The distance from the mobile tag 101 to anchor 102 can be determined by, $$d_{MA} = c(t_3 - t_2) \quad \text{(EQ 9)}.$$

Similarly, the distance from anchor 102 to the mobile tag 101 can be determined by, $$d_{AM} = c(t_5 - t_4) \quad \text{(EQ 10)}.$$

With the above equations, the roundtrip distance can be rewritten as, $$d_{r\text{-}trip} = c(t_5 - t_4 + t_3 - t_2) \quad \text{(EQ 11)}.$$

As noted earlier, the time to process the R-REQ signal and transmit the R-RSP signal via anchor 102 can be represented as $\Delta t = t_4 - t_3$. Anchor 102 can be configured to transmit the value of $\Delta t$ in the R-RSP signal for use by the mobile tag 101 in calculating $d_{r\text{-}trip}$. Substituting $\Delta t$ in $d_{r\text{-}trip}$ results in the formula, $$d_{r\text{-}trip} = c(t_5 - t_2 - \Delta t) \quad \text{(EQ 12)}.$$

Since the values of $t_5$, $t_2$, and $\Delta t$ are known to the mobile tag 101, the mobile tag 101 can readily calculate $d_{r\text{-}trip}$. The mobile tag 101 can also calculate the distance from the mobile tag 101 to anchor 102 based on the formula, $$d_{MA} = d_{r\text{-}trip}/2 \quad \text{(EQ 13)}.$$

It will be appreciated that the mobile tag 101 can also be configured to know a priori the fixed value of $\Delta t$ thus eliminating the need to transmit the value of $\Delta t$ in the R-RSP signal. This knowledge can be based on a pre-provisioning of the mobile tag 101 with this information prior to deployment. In yet another embodiment, the processing time to receive the R-REQ signal and respond with the transmission of the R-RSP signal can be a fixed processing time interval known and used by all devices in a network performing TW-TOA analysis. It will be further appreciated that the R-REQ and the R-RSP signals can be transmitted using ultra-wideband signaling technology to increase the accuracy of the $d_{r\text{-}trip}$ calculations. Accordingly, the TW-TOA illustrated in FIG. 5 can be used by either the mobile tag 101 or anchors in other embodiments to calculate a relative distance between each other.

It will be appreciated that the TDOA and TW-TOA processes described above can also be used between mobile tags 101. For example, FIGS. 1-3, 4A-4C, 5, and 6 can be adapted so that the anchors are replaced with mobile tags 101. In this embodiment, mobile tags 101 can use TDOA or TW-TOA to obtain location information amongst each other based on the processes described earlier for TDOA and TW-TOA, respectively.

It will be further appreciated that a mobile tag 101, depicted in FIGS. 1, 3, 4A-4C, and 5, can be configured with multiple antennas and phase detectors to calculate an angle of arrival of any wireless signal generated by an anchor and received by the mobile tag 101 based on a phase difference between the antennas determined from the received wireless signal. An angle of arrival calculation can be used to determine an angular orientation between a mobile tag 101 and an anchor. It will be further appreciated that the mobile tags 101 can be configured to determine a speed of travel of the mobile tag 101 by performing multiple location measurements over a time period. With angular orientation and speed of travel, a mobile tag 101 can also determine its trajectory of travel. Alternatively, the mobile tags 101 can be configured with an orientation sensor (e.g., a magnetometer) to determine an angular orientation with an anchor.

Figure 7:
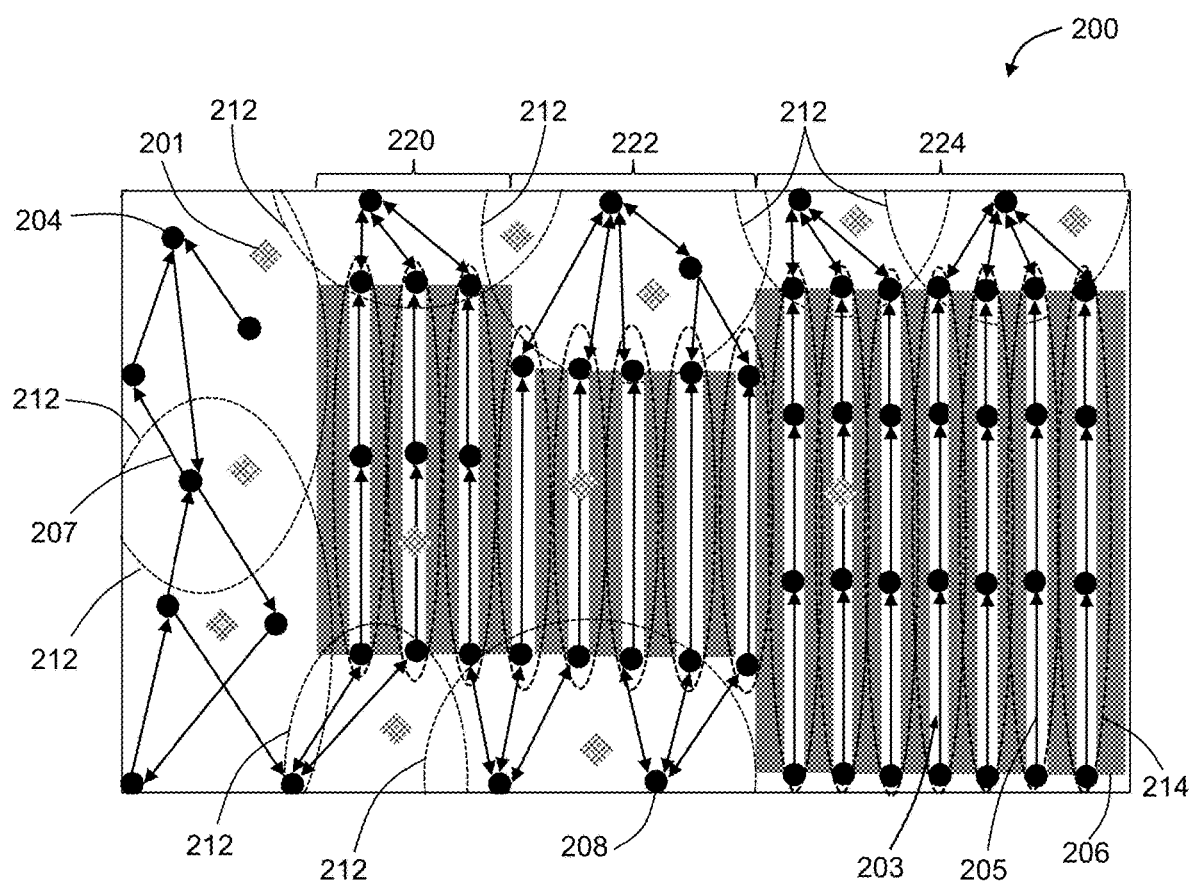
FIG. 7 is a block diagram illustrating an exemplary, non-limiting embodiment for determining location information of mobile tags in a demarcated area in accordance with various aspects described herein.

As will be discussed shortly, TDOA, TW-TOA, angular orientation, speed of travel, or combinations thereof can be utilized in an environment such as illustrated in FIG. 7.

FIG. 7 is a block diagram illustrating an exemplary, non-limiting embodiment for determining location information of mobile tags 201 in a demarcated area 200 in accordance with various aspects described herein. In the illustration of FIG. 7, the demarcated area 200 can represent a warehouse with racks or shelves 206 for managing the distribution of products and/or materials. It will be appreciated that the demarcated area 200 can correspond to numerous other use cases, including without limitation, a parking lot for managing parking spots, a commercial or retail environment for monitoring individuals and/or assets, assisted navigation of vehicles and/or machinery such as robots or forklifts, collision detection and avoidance of objects, managing separation between objects and/or individuals, as well as other suitable applications to which the subject disclosure can be applied. For illustration purposes only, the demarcated area 200 of FIG. 7 will be considered a warehouse with racks and/or shelves 206.

The measurement technique used by the mobile tags 201 to determine location information within the demarcated area 200 can depend on the location of the mobile tags 201 relative to other anchors 204 in the demarcated area 200. For example, when a mobile tag 201 is located in sections 212 (i.e., open spaces without shelving 206 and with line-of-site to pairs of anchors 204), the mobile tag 201 can be configured to perform TDOA measurements among pairs of anchors 204 as described above in relation to FIGS. 1, 2, 3, 4A, 4B, and 4C. On the other hand, when the mobile tag 201 is located in an aisle 203 between racks/shelves 206, the mobile tag 201 can be configured to perform TW-TOA measurements among one or more anchors 204 located in the aisle 203 as described above in relation to FIGS. 5-6.

Additionally, an aisle 203 can be configured with two or more anchors 204. An aisle 203 can have more than two anchors 204 when the coverage area of a first anchor 204 at one end of the aisle 203 has insufficient coverage to reach a second anchor 204 at the other end of the aisle 203 and vice-versa—see sections 220 and 224 and reference number 205. However, when the coverage area of a first anchor 204 at one end of the aisle 203 has sufficient coverage to reach a second anchor 204 at the end of the aisle 203 and vice-versa, then no more than two anchors 204 is necessary in the aisle 203—see region 222.

Figure 8:
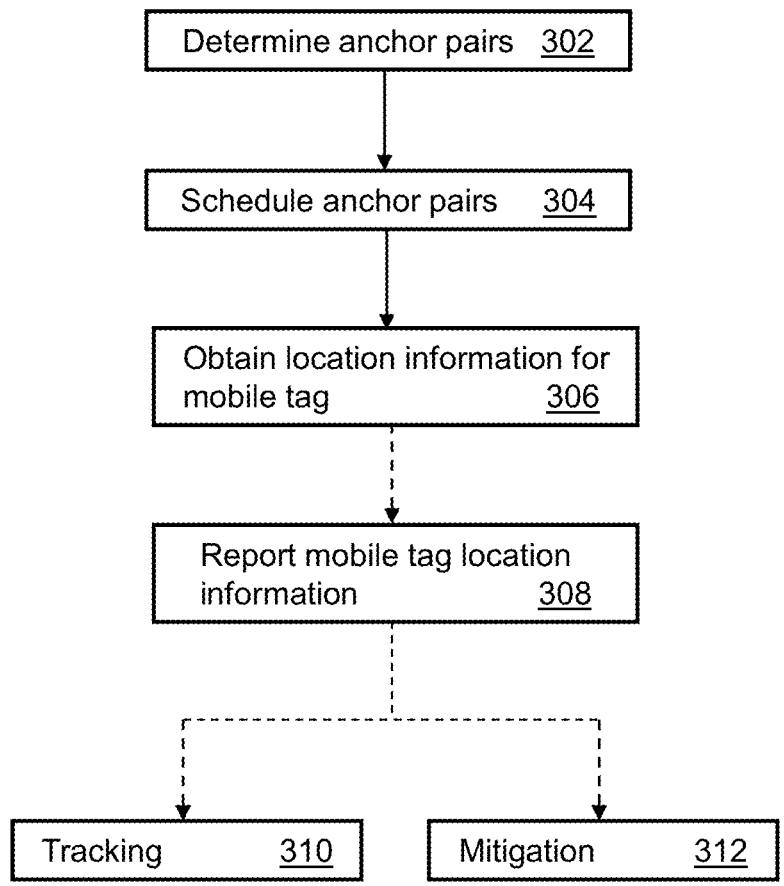
FIG. 8 depicts an illustrative embodiment of a method for determining location information and uses thereof in accordance with various aspects described herein.

FIG. 8 depicts an illustrative embodiment of a method 300 in accordance with various aspects described herein. Method 300 can begin at step 302 where a computing system, such as a server (described below in relation to FIG. 21), is configured to identify anchor pairs in the demarcated area 200 of FIG. 7 that provide sufficient coverage to enable TW-TOA or TDOA measurements depending on the location of the mobile tags 201.

In the case of open spaces, like region 212 (repeated in several portions of the demarcated area 200 of FIG. 7), mobile tags 201 are configured to use TDOA measurement techniques to determine location information. To enable TDOA measurements, the server is configured at step 302 to identify, for a certain number of x-y coordinates obtained from a digitization of an open space defined by region 212 where a mobile tag 201 may be located, at least three pairs of anchors 204 that have overlapping coverage that satisfy the condition described earlier in relation to FIGS. 3, 4A, 4B and 4C. It will be appreciated that techniques other than digitization of an open space can be used to identify possible x-y coordinates used by the server to perform step 302. In the case of spaces formed by aisles 203, like region 214 (repeated in several portions of the demarcated area 200 of FIG. 7), mobile tags 201 are configured to use TW-TOA measurement techniques to determine location information. To enable TW-TOA measurements, the server is configured at step 302 to identify at least two anchors 204 covering at least a portion of the aisle 203. The mobile tags 201 can be configured to perform TW-TOA with anchors 204 at opposite ends of an aisle 203 to provide further accuracy or at least validate location information determined by the mobile tag 201. As noted earlier, pairs of anchors 204 can be located at opposite ends of an aisle 203, or in between aisles 203 when a pair of anchors 204 is unable to cover for the full-length of an aisle 203. The mobile tag 201 can be configured to perform TW-TOA measurement according to the embodiments described above in relation to FIGS. 5-6.

For open spaces such as region 212, a server can be configured at step 302 to determine optimal pairs of anchors 204 in FIG. 7 that provide sufficient coverage for any mobile tag 201 in the area such as region 212 to perform triangulation with at least three pairs of anchors 204 that satisfy the conditions set forth in FIGS. 4A-4C. The process of selecting anchor pairs for TDOA triangulation and optimal coverage in open spaces defined by region 212 can be performed as an iterative analysis by a server at step 302, or by other techniques that enable convergence to a solution that provides coverage to mobile tags 201 across most (if not all) open spaces depicted by region 212. In the case of spaces defined by aisles 203, the server can identify the anchor pairs 204 in the aisles 203 that provide sufficient coverage to cover the aisle from end-to-end as illustrated by sections 220-224 of FIG. 7.

Figure 9:
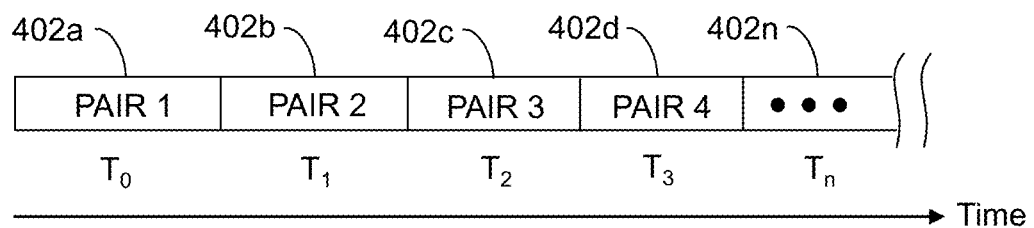
FIG. 9 is a block diagram illustrating an exemplary, non-limiting embodiment for scheduling a process for determining location information between mobile tags and pairs of anchors in the demarcated area of FIG. 7 in accordance with various aspects described herein.

Once the anchor pairs 204 have been identified, the server can proceed to step 304 to identify a schedule for communications between anchor pairs 204 and one or more mobile tags 201. In one embodiment, the anchors 204 can be configured to transmit and receive wireless signals (e.g., reference number 207) in a single frequency band. A single frequency band for performing TDOA or TW-TOA measurements can reduce the design complexity of mobile tags 201 and corresponding costs. To avoid collisions between anchor pairs 204 transmitting in a same frequency band near other anchors, the server can be configured to utilize a time-division scheme (timeslots) such as shown in FIG. 9 to enable anchor pairs 204 to communicate with each other and with one or more mobile tags 201 without causing signal interference (i.e., wireless collisions).

To achieve this, the server can be configured, for example, to determine at step 304 which anchor pairs 204 have overlapping coverage areas with other anchor pairs and schedule the communications between the anchor pairs and the mobile tags 201 during specific timeslots $T_0$-$T_n$ (e.g., 402a through 402n). In the case where a pair of anchors 204 does not have an overlapping coverage area with another anchor pair (e.g., anchor pairs at opposite ends of the demarcated area 200), the server can schedule simultaneous wireless communications of both anchor pairs 204 during a same timeslot (not shown in FIG. 9). As part of the scheduling process shown in FIG. 9, the server can be further configured at step 304 to determine which of the anchor pairs 204 will initiate/start a measurement session through a transmission of wireless signal ($s_1$). Such anchors 204 will be referred to herein as source anchors 204.

In one embodiment, the anchor pairs 204 identified by the server at step 302, and the transmission schedule and source anchors 204 determined by the server at step 304 can be communicated to all anchors 204 via gateway anchors 208 communicatively coupled to the server. Gateway anchors 208 can be located at the edges of the demarcated area 200 or in other locations of the demarcated area 200. Additionally, the server can also be configured to share the identification of the anchor pairs 204 and transmission schedules with the mobile tags 201. This information can be conveyed by gateway anchors 208 when the mobile tags 201 are in close vicinity thereto, or by way of other anchors 204 which can be configured to obtain this information from the gateway anchors 208 and relay the information to the mobile tags 201.

It will be appreciated that the locations of the anchors 204 in FIG. 7 can be predefined before the implementation of step 302 by the server. That is, the anchors 204 can be placed by one or more individuals managing the placement of shelves/racks, etc. in the demarcated area 200. The specific x-y coordinate locations of the anchors 204 can be determined by such individuals and communicated to the server via, for example, a look-up table provided to the server, in order to perform step 302.

It will be further appreciated that in other embodiments, the location of anchors can instead be determined by the server at step 302. In this embodiment, the server can be provided with the location of racks/shelves and/or other objects in the demarcated area 200 along with dimensions of the demarcated area 200 and dimensions of the racks/shelves and/or other objects. The server can then be configured to perform an iterative analysis to determine a location for anchors 204 relative to the racks/shelves identified to the server that provide desirable coverage for mobile tags 201 to perform TDOA analysis in open spaces or TW-TOA analysis in aisles 203. In this embodiment, the server can be configured to report the x-y coordinate locations of anchors 204 to one or more personnel managing the floor space of the demarcated area 200 for placement of the anchors 204 in their corresponding x-y coordinate locations.

It will be further appreciated that once the anchors 204 have been placed in their designated locations determined by the server, the server can be configured to provide the x-y coordinates to all anchors 204 in the demarcated area 200 via gateway anchors 208 as described above. This information can also be conveyed by gateway anchors 208 when the mobile tags 201 are in close vicinity thereto, or by way of other anchors 204 which can be configured to obtain this information from the gateway anchors 208 and relay the information to the mobile tags 201.

Referring back to FIG. 8, at step 306, mobile tags 201 can be configured to initiate a process using TDOA or TW-TOA (and in some instances angular orientation measurements) to obtain location information depending on the location of the mobile tag 201 in the demarcated area 200. In one or more embodiments (although other techniques can be utilized) to assist mobile tags 201 in identifying whether they are in region 212 (i.e., open spaces) or region 214 (i.e., aisles 203), the source anchors 204 can be configured to transmit in the first wireless signal ($s_1$) an indication of whether to use TDOA or TW-TOA. The indication may be a flag or message that enables the mobile tag 201 to determine whether it is in region 212 (an open space) or region 214 (an aisle 203). The first wireless signal ($s_1$) can also convey to the mobile tag 201 the x-y coordinates of one or both anchor pairs 204. Alternatively, the mobile tags 201 can be configured with a look-up table that includes the x-y coordinates of all anchors 204 in the demarcated area 200. The mobile tags 201 can obtain the look-up table from the server via the gateway anchors 208 or during provisioning of the mobile tag 201 by a user before the mobile tag 201 is deployed for use in the demarcated area 200. It will be further appreciated that step 306 can be adapted to enable mobile tags 101 to measure and thereby obtain location information between each other using TDOA or TW-TOA as described earlier in relation to FIGS. 1-3, 4A-4C, 5, and 6.

Once a mobile tag 201 calculates location information via TDOA or TW-TOA measurement techniques, the mobile tag 201 can in turn report at step 308 the location information to other devices such as other mobile tags 201, the anchors 204 in its coverage area, and/or the server by communicating directly to one or more gateway anchors 208 or indirectly via one or more intermediate anchors 204 that can communicate with the one or more gateway anchors 208. The location information can include without limitation, x-y coordinates of the mobile tag 201 within the demarcated area 200, a speed of travel of the mobile tag 201 determined from multiple location measurements over a time period, a trajectory of the mobile tag 201, angular orientation of the mobile tag 201 relative to other anchors 204 and/or other mobile tags 201, or any combinations thereof. Since sharing location information does not require precision measurements via ultra-wideband signals, the mobile tags 201 can be configured to share location information with other devices using lower power wireless signaling techniques such as Bluetooth®, ZigBee®, WiFi or other suitable wireless signaling protocols.

Sharing location information of the mobile tags 201 enables the server and/or other devices such as the anchors 204 and other mobile tags 201 to track at step 310 movement and location of the mobile tags 201 and detect and perform mitigation procedures at step 312. For example, mobile tags 201 can be configured to detect issues such as proximity violations and/or possible collisions between mobile tags 201 from this shared information. Upon detecting such issues, the mobile tags 201 can be configured to assert an alarm (audible and/or visual) and/or take further mitigation action such as slow down or otherwise disable a vehicle (e.g., a forklift, robot, automobile, etc.) that may collide with an individual carrying a mobile tag 201. The mobile tag 201 may be integrated in an identification badge or embedded in a mobile communication device (e.g., mobile phone, tablet, etc.), clipped on a shirt, integrated into an article of clothing of the individual or otherwise carried by the individual via other suitable methods for carrying the mobile tag 201.

It will be appreciated that method 300 can be adapted for other embodiments contemplated by the subject disclosure. For example, at step 306, a mobile tag 201 can be adapted to obtain location information based on a determination of whether it is in an open space defined by region 212 or an aisle 203 defined by region 214. A mobile tag 201, for example, can receive wireless signals from both an anchor 204 in an open space and an anchor 204 in an aisle 203. To determine whether to perform a TDOA measurement or a TW-TOA measurement, the mobile tag 201 can be configured to obtain from its internal memory a history of locations in the demarcated area 200 that are stored by the mobile tag 201 to determine if the most recent location (or trajectory of the mobile tag 201) places the mobile tag 201 in an open space, region 212, or aisle 203, region 214.

If the mobile tag 201 determines it is likely in an open space, region 212, it can proceed to perform TDOA analysis based on the wireless signals generated by anchor pairs 204 in the open space. Otherwise, if the mobile tag 201 determines it is likely in an aisle, region 214, it can proceed to perform TW-TOA analysis based on the wireless signals generated by anchor pairs 204 in the aisle 203. If the mobile tag 201 is unable to make a determination of where it is likely located from a history of locations, the mobile tag 201 can be configured to perform TDOA analysis based on the wireless signals generated by anchor pairs 204 in the open space and TW-TOA analysis based on the wireless signals generated by anchor pairs 204 in the aisle 203. The mobile tag 201 can be configured to compare the location determined from TDOA and the location determined from TW-TOA to the stored location history and thereby make a determination as to which location to choose that more closely mimics the location history of the mobile tag 201.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, steps 308-312 can be optional.

Figure 10:
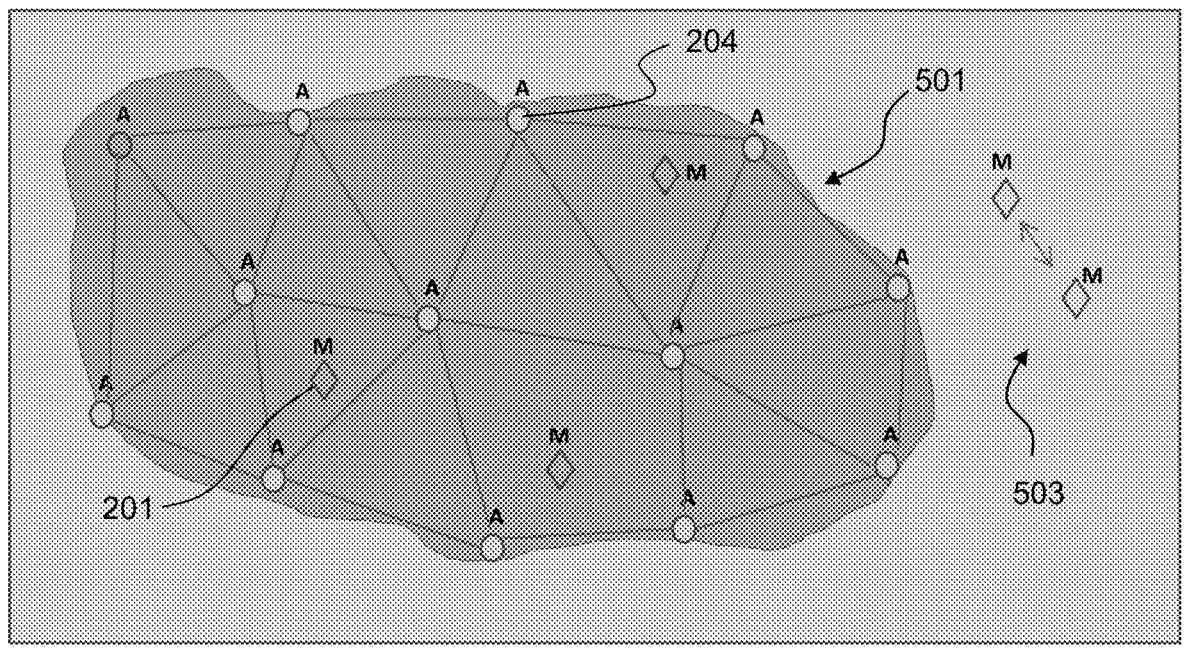
FIG. 10 is a block diagram illustrating an exemplary, non-limiting embodiment of environments where mobile tags can operate from in accordance with various aspects described herein.

FIG. 10 is a block diagram illustrating an exemplary, non-limiting embodiment of environments where mobile tags can operate from in accordance with various aspects described herein. Mobile tags 201 can at certain times operate within a network 501 of anchors 204 (such as described above in relation to FIG. 7) to obtain their location as described above. However, users (or vehicles or other mobile devices) carrying a mobile tag 201 can transition to an open space 503 that is outside of the coverage of the network 501. When this occurs, the mobile tags 204 can be configured to transition to peer-to-peer communications (i.e., tag-to-tag communications) to continue to obtain location information relative to other mobile tags in the open space 503.

Figure 11:
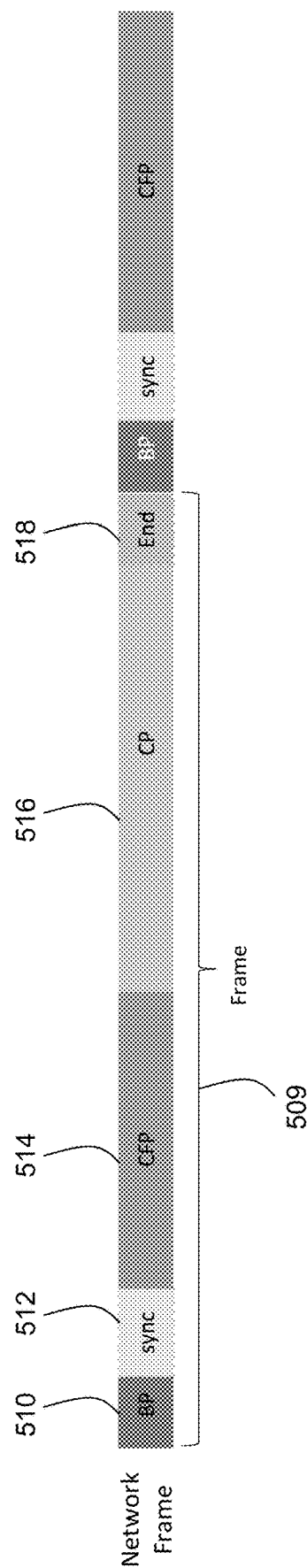
FIG. 11 is a block diagram illustrating an exemplary, non-limiting embodiment of a network frame in accordance with various aspects described herein.

FIG. 11 is a block diagram illustrating an exemplary, non-limiting embodiment of a network frame 509 that can be utilized by the network 501 in accordance with various aspects described herein. The network frame 509 can include a beacon signal 510, a sync period 512, a contention-free period (CFP) 514, a contention period (CP) 516, and an end period 518. The beacon signal 510 is generated by anchors 204 to provide anchors 204 and mobile tags 201 a means for synchronization. The CFP 514 portion of the frame 509 supports downlink TDOA (DL-TDOA) ranging packets, which in turn also supports the anchor pair scheduling depicted in FIG. 9. In the present context, the term "downlink" means communications from anchor to mobile tag, while the term "uplink" means communications from mobile tag to anchor. Transmissions during CFP 514 are scheduled to avoid simultaneous transmissions that lead to wireless signal interference. The CP 516 portion of the frame 509 supports uplink TDOA (UL-TDOA), TW-TOA ranging packets and additional data packets/control signaling packets and can be subject to simultaneous transmissions that in turn may interfere with each other.

The sync period 512 (which can be optional) provides a short buffer period for anchors 204 to synchronize the start of the CFP 514 to each other. The end period 518 (which can be optional) provides a short buffer period for a next frame 509 preparation or can serve as a guard interval for ACK message transmissions. The network frame 509 is periodic as shown by the next repetitive sequence of fields in a subsequent network frame. Various other scheduling and timing, including use of particular frame structures, can be used with the exemplary embodiments of the subject disclosure as described in U.S. Pat. No. 10,779,118, filed Jan. 11, 2019, to Duan et al., the disclosure of which is hereby incorporated by reference herein in its entirety.

Figure 12:
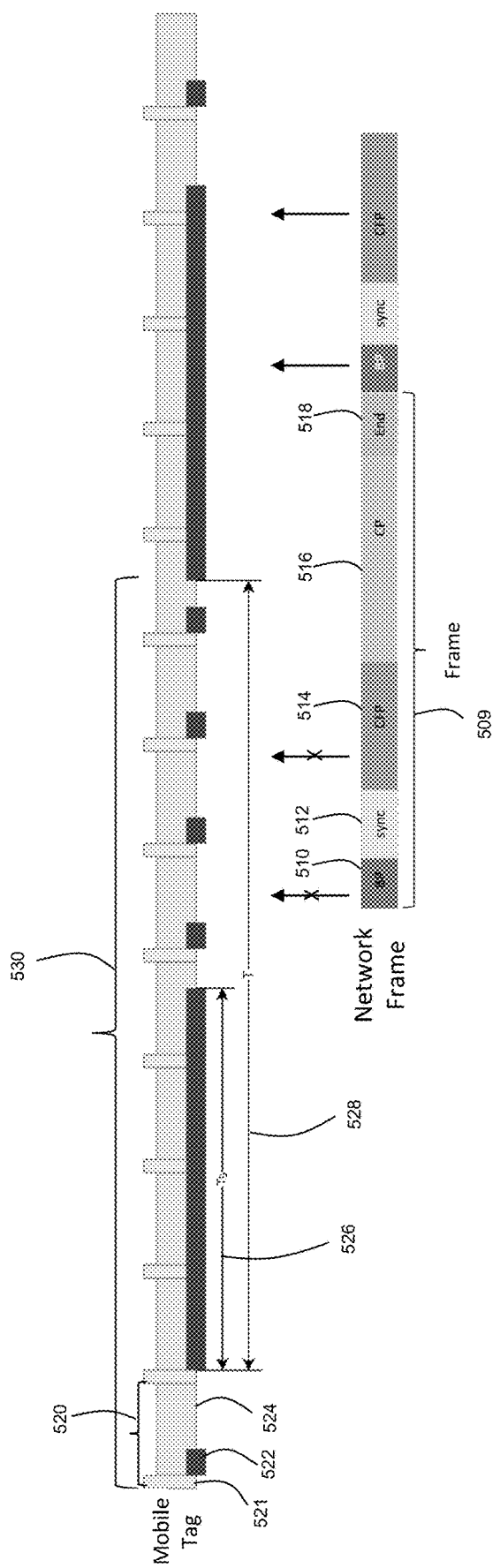
FIG. 12 is a block diagram illustrating an exemplary, non-limiting embodiment of a peer-to-peer frame configured for monitoring a presence of a network frame in accordance with various aspects described herein.

FIG. 12 is a block diagram illustrating an exemplary, non-limiting embodiment of a peer-to-peer frame configured for monitoring a presence of a network frame 509 in accordance with various aspects described herein. The peer-to-peer frame is referred to herein as a peer-to-peer super-frame 530. The peer-to-peer super-frame 530 can include a peer-to-peer sub-frame 520 and a network sub-frame 528. The peer-to-peer sub-frame 520 enables a mobile tag 201 located in the open space 503 of FIG. 10 to perform peer-to-peer range measurements as will be described in relation to FIGS. 14A-14D below. The peer-to-peer sub-frame 520 can include a peer-to-peer beacon signal 521, a ranging period 522, and a listening period 524.

The peer-to-peer beacon signal 521 can be a Bluetooth (or ultra-wideband) signal that a mobile tag 201 broadcasts to other mobile tags 201 to initiate a ranging process to determine the relative location of the mobile tag 201 to other mobile tags 201 in its vicinity. The peer-to-peer beacon signal 521 can be an announcement message and/or synchronization signal to enable other mobile tags 201 to properly initiate a ranging process. During the ranging period 522, the mobile tag 201 can be configured to perform ranging measurements using ultra-wideband signals or other techniques (e.g., RF signal strength indicator (RSSI)). During the listening period 524, the mobile tag 201 can be configured to monitor response messages from other mobile tags 201 in its communication range using a Bluetooth (or ultra-wideband) receiver. The peer-to-peer sub-frame 520 is periodic as shown in FIG. 12.

To detect the presence of the network 501 with anchors 204, the mobile tag 201 can be configured to monitor during the network sub-frame 528 for a beacon signal 510 generated by one or more anchors 204 in the network 501. During the network sub-frame 528, the mobile tag 201 can be configured to turn on the ultra-wideband receiver to monitor a beacon signal 510 generated by one or more anchors 204 using an ultra-wideband transmitter. Generally, the ultra-wideband receiver of the mobile tag 201 draws more current than a Bluetooth narrowband receiver. To extend battery life of the mobile tag 201, the mobile tag 201 can be configured to maintain the ultra-wideband receiver on for a period 526 (depicted as $T_S$), which is less than the period (depicted as T) of the network sub-frame 528. The period 526 ($T_S$) can be chosen sufficiently large to enable the mobile tag 201 to detect a beacon signal of at least one network frame 509.

In the illustration of FIG. 12, a first instance of the beacon signal 510 is not detected because it occurs outside the period 526 ($T_S$) in which the ultra-wideband receiver of the mobile tag 201 is enabled to monitor for beacon signals. However, during a second instance of a super-frame 530, a beacon signal from a second instance of a network frame 509 is detected during the period 526 ($T_S$) of the network-subframe 528 of the mobile tag 201. Upon detecting the beacon signal 510, the mobile tag 201 can be configured to extend the period 526 ($T_S$) to enable the mobile tag 201 to receive multiple instances of a beacon signal 510 which enables the mobile tag 201 to synchronize its clock to the network frame 509. Upon achieving synchronization, the mobile tag 201 can be configured to determine whether transitioning from a peer-to-peer communications mode (as depicted in FIG. 12) to a network communications mode (as depicted in FIG. 11) is warranted.

In an embodiment, the mobile tag 201 can be configured to store a coverage map of the network 501. The coverage map can indicate areas in the network 501 where access to anchors 204 is available and not available. Alternatively, or in combination with the foregoing embodiment, the mobile tag 201 can be configured to receive a message including a coverage map (or portion of the coverage map that represents a vicinity where the mobile tag 201 is located) from at least one anchor 204 after the mobile tag 201 has synchronized to the network frame 509. The mobile tag 201 can also be configured to track a history of its movements from the time it left the network 501 to an open space 503 not inside the wireless coverage area of the network 501. The mobile tag 201 can perform this type of tracking by utilizing an accelerometer, gyroscope, and/or magnetometer (compass) to determine a history of positions from inside the network 501 to an open space 503 and back to the network 501. By tracking a history of positions, the mobile tag 201 can determine where it is in the coverage map of the network 501 and thereby determine whether it is in a communication range of one or more anchors 204 in the network 501. Alternatively, the mobile tag 201 can be configured to try to communicate with one or more anchors 204 and determine from ranging measurements whether it is located in the network 501. In yet another embodiment, the mobile tag 201 may receive messages from anchors 204 during a CFP period and based on the number of messages and quality of messages received during the CFP period determine if it is in the communication coverage of anchors 204 in the network 501.

Figure 13:
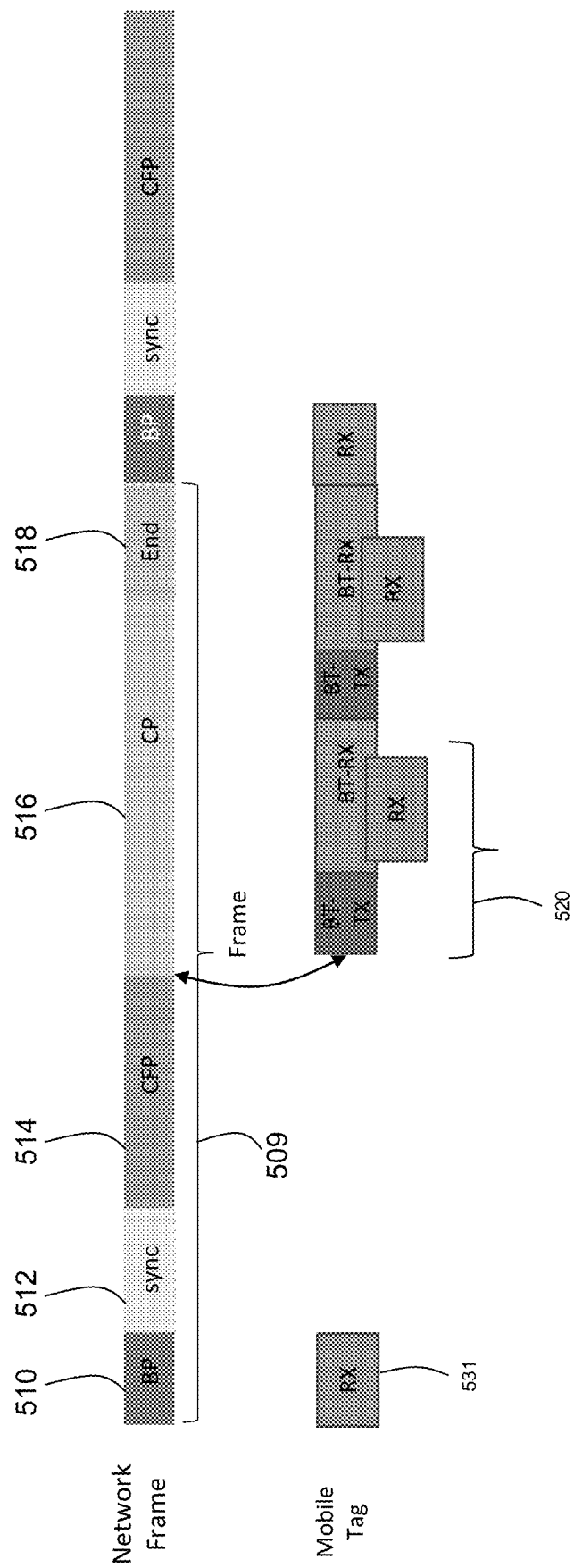
FIG. 13 is a block diagram illustrating an exemplary, non-limiting embodiment of a mobile tag configured to utilize peer-to-peer communications in a manner that avoids interfering with portions of a network frame in accordance with various aspects described herein.

If the mobile tag 201 cannot reliably communicate with anchors 204 in the network 501, or cannot make an accurate measurement of its location relative to one or more anchors, and/or it determines from a coverage map and position history that it is in an area of the network 501 where anchors 204 are not accessible, then the mobile tag 201 can be configured to adjust peer-to-peer mobile tag communications to occur in a position in a network frame 509, which minimizes the chances of causing wireless signal interference with anchors 204 or other mobile tags 201 engaged in a network communications mode as depicted in FIG. 13.

FIG. 13 is a block diagram illustrating an exemplary, non-limiting embodiment of a mobile tag 201 configured to utilize peer-to-peer communications in a manner that avoids interfering with portions of a network frame 509 in accordance with various aspects described herein. To minimize RF interference with anchors 204 and/or other mobile tags 201 operating in a network communications mode, a mobile tag 201 that has insufficient coverage in the network 501 (e.g., cannot access one or more anchors 204) can be configured to maintain peer-to-peer communications in the CP 516 portion (i.e., contention period) of the network frame 509 and maintain synchronicity with the network frame 509 by monitoring the beacon signal 510 via a short listening period 531. Since the CP 516 portion allows for contentions (i.e., RF interference due to simultaneous RF transmissions), contentions caused by the mobile tag 201 performing peer-to-peer communications can be tolerated and will not cause issues with RF transmissions by anchors 204 utilizing the CFP portion 514 (contention-free period) of the network frame 509. The mobile tag 201 can perform this adjustment after it has synchronized its clock to the network frame 509 utilizing the beacon signal 510 as a reference signal. Once the mobile tag 201 has adapted peer-to-peer communications in the CP portion 516 of the network frame 509, the mobile tag 201 can cease to use timing associated with the peer-to-peer super-frame 530 depicted in FIG. 12, and instead resort to utilizing only the sub-frame 520 within the CP portion 516 of the network frame 509.

If, on the other hand, the mobile tag 201 determines that it is in the communication range of a sufficient number of anchors 204 in the network 501 to adequately determine its location in the network 501, then the mobile tag 201 can be configured to fully transition to a network communications mode by ceasing to utilize peer-to-peer communications altogether as depicted in FIG. 12 and rely exclusively on communications with anchors 204 utilizing the network frame 509 of FIG. 11.

Figure 14A:
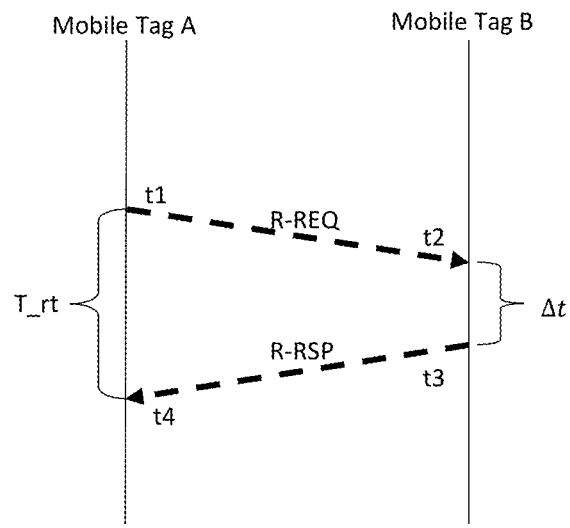
FIGS. 14A, 14B, 14C, 14D, and 14E are block diagrams illustrating exemplary, non-limiting embodiments of peer-to-peer communications for determining a location of a mobile tag in accordance with various aspects described herein.

FIGS. 14A-14D describe various embodiments for peer-to-peer communications that can be applied to the aforementioned embodiments described above. FIG. 14A depicts a two-way time of arrival (TW-TOA) peer-to-peer process for determining distances between mobile tags (mobile tag A and mobile tag B). The process can begin at mobile tag A which transmits a range request (R-REQ) signal to mobile tag B at time $t_1$. Mobile tag B receives the R-REQ signal at time $t_2$. Mobile tag B processes the R-REQ signal for a period of $\Delta t$, and responsive thereto transmits a range response (R-RSP) signal at $t_3$. Mobile tag A receives the R-RSP signal at $t_4$. Mobile tag A can determine a roundtrip distance based on the formula $d_{r-trip}=d_{AB}+d_{BA}$, where $d_{r-trip}$ is the roundtrip distance, which is the sum of $d_{AB}$, the distance from mobile tag A to mobile tag B, and $d_{BA}$, the distance from mobile tag B to mobile tag A. The distance from mobile tag A to mobile tag B can be determined by $d_{AB}=c(t_2-t_1)$, where c is the speed of light. Similarly, the distance from mobile tag B to mobile tag A can be determined by $d_{BA}=c(t_4-t_3)$. Substituting the above equations, the roundtrip distance can be rewritten as $d_{r-trip}=C(t_4-t_3+t_2-t_1)$.

The time to process the R-REQ signal and to transmit the R-RSP signal via mobile tag B can be represented as $\Delta t=t_3-t_2$. Mobile tag B can be configured to transmit the value of $\Delta t$ in the R-RSP signal for use by mobile tag A in calculating $d_{r-trip}$. Substituting $\Delta t$ in $d_{r-trip}$ results in the formula: $d_{r-trip}=c(t_4-t_1-\Delta t)$. Since the values of $t_4$, $t_1$, and $\Delta t$ are known to mobile tag A, mobile tag A can readily calculate $d_{r-trip}$. Mobile tag A can also calculate the distance from mobile tag A to mobile tag B based on the formula: $d_{AB}=d_{r-trip}/2$. It will be appreciated that mobile tag A can also be configured to know a priori the fixed value of M. In yet another embodiment, the processing time to receive the R-REQ signal and respond with the transmission of the R-RSP signal can be a fixed processing time interval known and used by all mobile tags performing TW-TOA analysis. In the foregoing embodiments, the value of $\Delta t$ would no longer need to be transmitted in the R-RSP signal. It will be further appreciated that the R-REQ and the R-RSP signals can be transmitted using ultra-wideband signaling technology to increase the accuracy of the $d_{r-trip}$ calculations or derivatives thereof. Accordingly, the TW-TOA illustrated in FIG. 14A can be used by either mobile tag A or mobile tag B to calculate a relative distance between each other. This process can be utilized in the embodiments that follow below.

Figure 14B:
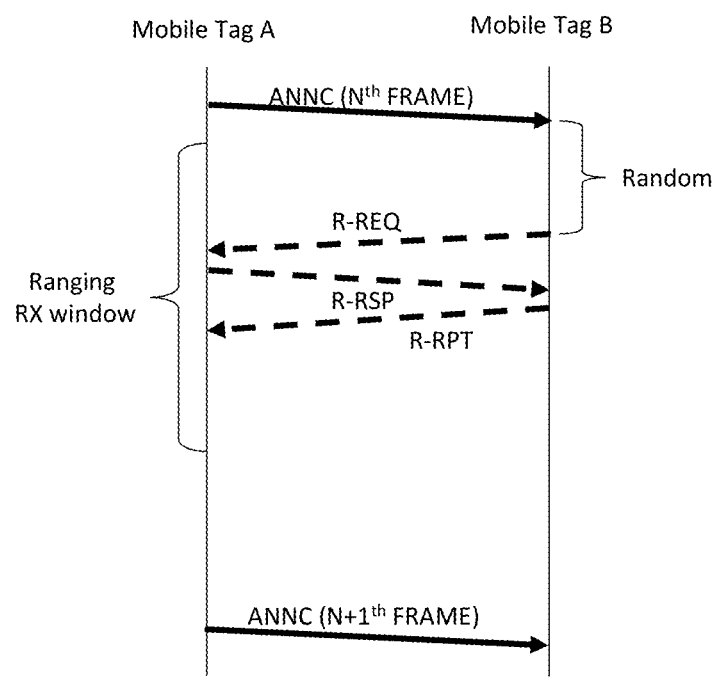

FIG. 14B depicts an exemplary, non-limiting embodiment of a peer-to-peer process for determining location data between mobile tags in accordance with various aspects described herein. In FIG. 14B, mobile tag A can begin by transmitting an announcement wireless signal (ANNC) utilizing a low power narrow band transmitter (such as a Bluetooth transmitter). Upon receiving at mobile tag B, the announcement signal utilizing a narrow band receiver (e.g., Bluetooth receiver), mobile tag B can in response select a random time to transmit via a wideband transmitter a range request (R-REQ) signal utilizing a wideband signaling technology (e.g., ultra-wideband signal at high frequencies such as 500 MHz). Mobile tag A can be configured to turn on a wideband receiver (e.g., for receiving ultra-wideband signals) during a ranging RX window as shown in order to receive the R-REQ signal from mobile tag B and/or other mobile tags in a vicinity of mobile tag A that are responding to the announcement signal generated by mobile tag A.

Upon receiving the R-REQ signal, mobile tag A can be configured to enable a wideband transmitter (e.g., for transmitting ultra-wideband signals) to transmit a range response (R-RSP) signal. Mobile tag B can receive the R-RSP signal with a wideband receiver (e.g., for receiving ultra-wideband signals). Upon receiving the R-RSP signal, mobile tag B can determine the round-trip time between the R-REQ signal and the R-RSP signal and thereby determine a distance between mobile tag B and mobile tag A as described in relation to FIG. 14A. The R-RSP signal can include a processing time by mobile tag A to receive R-REQ and thereafter transmit R-RSP (M), or such time can be known to mobile tag B as previously described.

In addition to measuring a relative distance between mobile tags, mobile tag B (or mobile tag A) can be configured with multiple antennas to calculate an angle of arrival of the R-RSP signal based on a phase difference between the antennas. Such angle of arrival can be used to determine an angular orientation between mobile tag B and mobile tag A. By combining the angular orientation with a determination of the distance between mobile tags A and B, mobile tag B can also determine a location and angular orientation of mobile tag A relative to the location of mobile tag B.

Additionally, the announcement signal can be submitted periodically or asynchronously to prompt multiple measurements by mobile tag B (and other mobile tags in a vicinity for receiving the announcement signal) utilizing the process described in FIG. 14B. Distance and angular orientation can be used by mobile tag B (and other mobile tags) to also determine a trajectory of mobile tag A relative to mobile tag B (and vice-versa). Mobile tag B can also be configured to report to mobile tag A location information such as the measured distance, angular orientation, position, and/or trajectory of mobile tag A and/or B via a range report (R-RPT) signal. The R-RPT signal can be a narrow band signal (e.g., Bluetooth) or wideband signal (e.g., ultra-wideband). The trajectory data can be used to predict collisions between mobile tags A and B enabling each mobile tag to take mitigation action such as asserting an alarm at mobile tag B and/or mobile tag A.

Additionally, warning conditions can be provisioned at both mobile tags A and B to determine conformance with a required separation between mobile tags A and B. The warning conditions can be separation thresholds and/or trajectory thresholds. If the warning condition is not satisfied, mobile tags A and/or B can be configured to assert alarms. The alarms can be audible alarms, illuminating alarms (e.g., flashing colored light) or a combination thereof. Additionally, the embodiments depicted by FIG. 14B can be reversed in which mobile tag B is the one originating the announcement signal and mobile tag A calculates its location and/or orientation relative to mobile tag B as described above, and shares the same with mobile tag B.

Figure 14C:
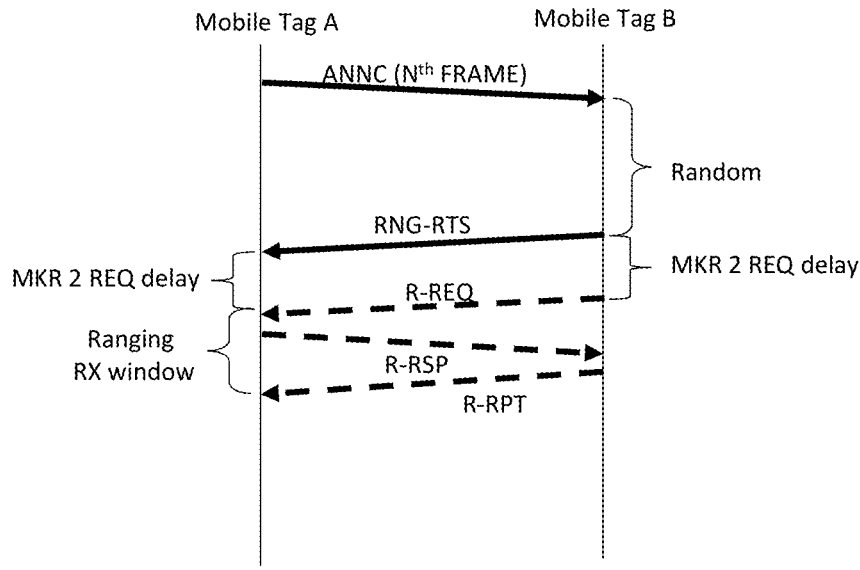

FIG. 14C depicts an adaptation to the embodiments of FIG. 14B. In particular, mobile tag B can be configured to transmit in response to the announcement signal a range ready-to-send (RNG-RTS) signal using narrow band signaling technology such as Bluetooth. The RNG-RTS signal can include timing information that indicates when mobile tag B will transmit the R-REQ signal. By knowing this timing, mobile tag A can substantially reduce the ranging RX window (which saves battery life of mobile tag A) by knowing the arrival time of the R-REQ signal and a predetermined time for receiving the R-RPT signal. If an R-RPT signal is not expected, mobile tag A can shorten the ranging RX window even further and thereby further improve battery life. The location and/or orientation measurements can be performed by mobile tag B as previously described in relation to FIG. 14B.

Figure 14D:
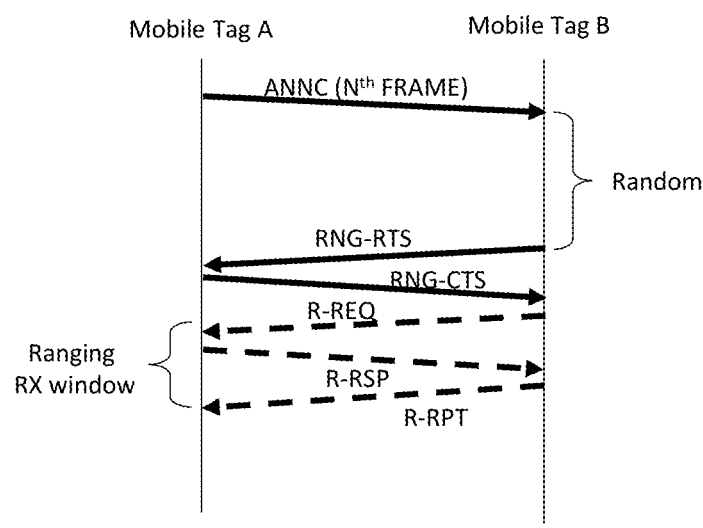

FIG. 14D depicts an adaptation to the embodiments of FIGS. 14B-14C. In this illustration, mobile tag A can be configured to transmit in response to the RNG-RTS signal a ranging clear-to-send (RNG-CTS) signal using narrow band signaling technology such as Bluetooth. The RNG-CTS signal can include timing information that indicates when mobile tag B should transmit the R-REQ signal. In this embodiment, mobile tag A can control the initial transmission time of the R-REQ signal thereby enabling mobile tag A to limit the size of the ranging RX window, reduce current draw from the ultra-wideband transceiver and thereby improve battery life of mobile tag A. The previously described embodiments of FIGS. 14B-14C are applicable to FIG. 14D for performing location and/or orientation measurements by mobile tag B and sharing such information with mobile tag A via the R-RPT signal.

Figure 14E:
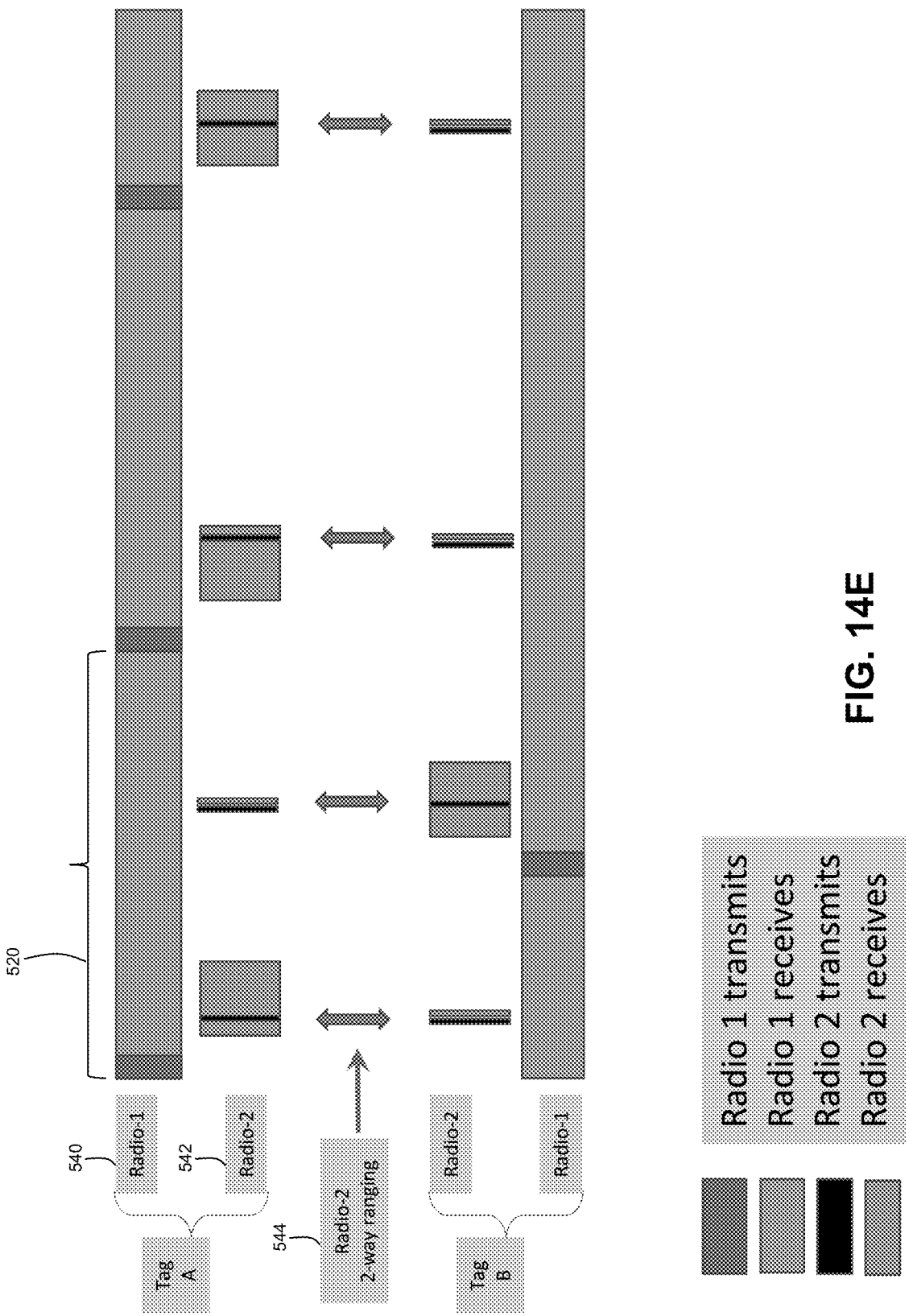

FIG. 14E temporally depicts illustrations of peer-to-peer communications between mobile tags based on transmission and reception intervals for achieving the embodiments described in relation to FIGS. 14A-14D. Each mobile tag is equipped with two radios (radio-1 540 and radio-2 542). Radio-1 540 is configured to transmit and receive Bluetooth signals, while radio-2 542 is configured to transmit and receive ultra-wideband signals. Since Bluetooth signals are narrow band signals, Bluetooth operations expend less power than ultra-wideband signals. Accordingly, utilizing a Bluetooth radio, when possible, can extend battery life of the mobile tags. FIG. 14E also depicts components of the peer-to-peer super-frame 530 previously described in FIG. 12 for performing peer-to-peer range measurements 544. As described in FIG. 12, peer-to-peer sub-frames 520 can be combined with the network sub-frame 528 to form a peer-to-peer super-frame 530, which enables a mobile tag 201 to perform peer-to-peer range measurements with other mobile tags 201 while monitoring for a presence of network anchors (not shown in FIG. 14E) that can trigger a process for transitioning a network communications mode as will be described further in relation to method 600 of FIG. 17.

Figure 15:
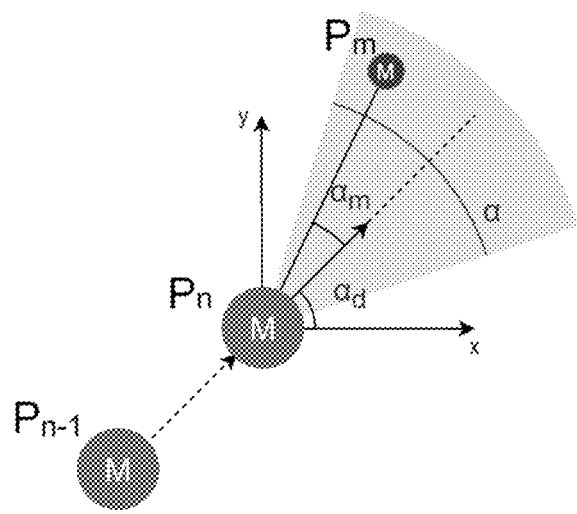
FIG. 15 is a block diagram illustrating an exemplary, non-limiting embodiment of capabilities of a mobile tag to determine its location in a network of anchors providing location services in accordance with various aspects described herein.

FIG. 15 is a block diagram illustrating an exemplary, non-limiting embodiment of capabilities of a mobile tag 201 to determine its location in a network of anchors providing location services in accordance with various aspects described herein. In the illustration of FIG. 15, a mobile tag 201 located in the network 501 of anchors 204 and operating in a network communications mode (i.e., exclusively performing ranging measurements with anchors 204) can determine its relative position to another mobile tag 201 and, based on a history of positions ($P_{n-1}$ to $P_n$), its angular trajectory relative to the other mobile tag 201. Such angular trajectory can be used to assert alarms to avoid collisions, enforce social distancing, and/or other policies set by an administrator of the mobile tags 201 and/or network 501 of anchors 204.

Figure 16:
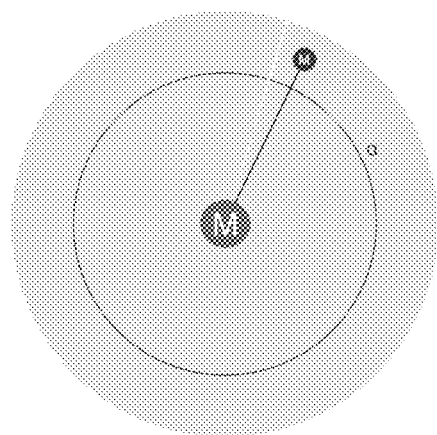
FIG. 16 is a block diagram illustrating an exemplary, non-limiting embodiment of capabilities of a mobile tag to determine its location utilizing peer-to-peer communications with other mobile tags in accordance with various aspects described herein.

FIG. 16 is a block diagram illustrating an exemplary, non-limiting embodiment of capabilities of a mobile tag 201 to determine its location utilizing peer-to-peer communications with other mobile tags 201 in accordance with various aspects described herein. In the illustration of FIG. 16, the mobile tag 201 is limited to determining its relative location to another mobile tag 201 without trajectory information or angular orientation. In an alternative embodiment, the mobile tag 201 can perform the functions described in relation to FIG. 15 with instrumentation such as one or more accelerometers, one or more gyroscopes, and/or a magnetometer. With such instrumentation, a mobile tag 201 can utilize as a reference point a last known location of the mobile tag 201 while in the network 501 of anchors 204 and determine thereafter utilizing the instrumentation a history of positions ($P_{n-1}$ to $P_n$) and its angular trajectory relative to another mobile tag 201 utilizing similar instrumentation.

Figure 17:
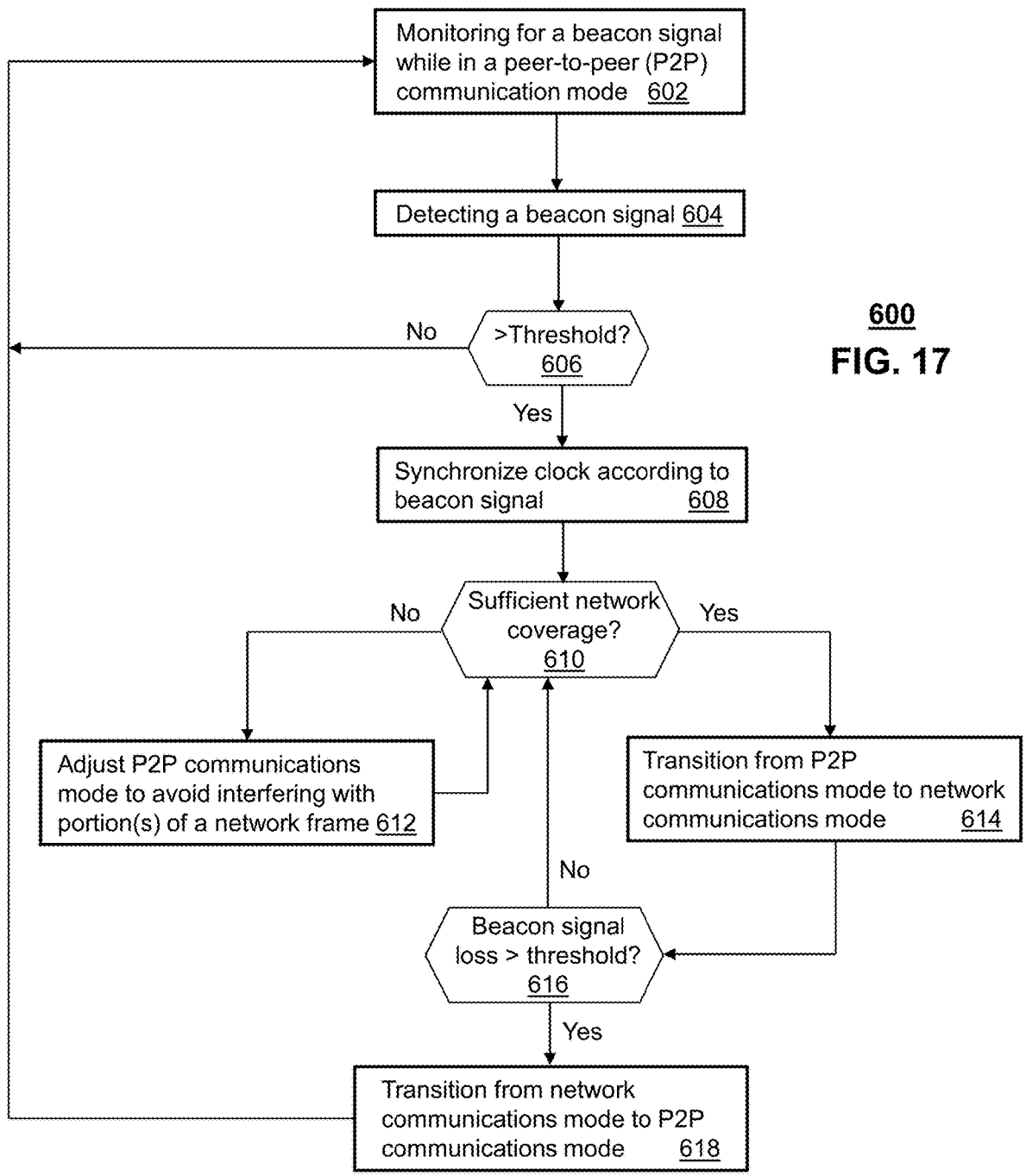
FIG. 17 depicts an illustrative embodiment of a method for transitioning between modes of communications; particularly, peer-to-peer communications mode and network communications mode in accordance with various aspects described herein.

FIG. 17 depicts an illustrative embodiment of a method 600 for transitioning between modes of communications; particularly, peer-to-peer communications mode and network communications mode in accordance with various aspects described herein. Method 600 can begin with step 602 where a mobile tag can be configured to monitor a beacon signal while in a peer-to-peer communications mode utilizing, for example, the peer-to-peer super-frame 530 (and corresponding network sub-frame 528) shown in FIG. 12. As noted earlier, the peer-to-peer communication mode may be invoked when the mobile tag 201 transitions out of the coverage area of the network 501 of anchors 204 into an open space 503 or when the mobile tag 201 is located in the network 501 in an area that lacks coverage from anchors 204, which causes the mobile tag 201 to resort to the embodiment described in relation to FIG. 13.

Upon detecting a beacon signal at step 604 while in a peer-to-peer communications mode, the mobile tag 201 can proceed to step 606 where it determines if a threshold of instances of a beacon signal has been satisfied (e.g., a threshold set to greater than 2 consecutive beacon signals).

If the threshold is not satisfied, the mobile tag 201 can be configured to return to step 602 and continue the monitoring process. If the threshold is satisfied, the mobile tag 201 can be configured at step 608 to synchronize its clock to the network frame 509 of FIG. 11 utilizing one or more instances of the beacon signal. In an embodiment, synchronization can take place during one or more instances of the synchronization period 512. Once synchronized, the mobile tag 201 can proceed to step 610 to determine if there is sufficient coverage in the network 201 to transition to a network communications mode (i.e., performing ranging measurements exclusively with the assistance of one or more anchors 204).

In one embodiment, the coverage determination of step 610 can be performed by the mobile tag 201 by comparing its location to a look-up table (or database) of sub-coverage areas in the network 501 (not shown in FIG. 10). If the mobile tag 201 has instrumentation to reasonably determine where it is located within the network 501, such location information may be sufficient for the mobile tag 201 to determine from a look-up table (or database) whether it is in an area of the network 501 where it has sufficient access to anchors 204 to safely transition to a network communications mode, or whether it should transition to an adjusted peer-to-peer communications mode as depicted FIG. 13. The look-up table (or database) can be provided by one or more anchors at a previous time when the mobile tag 201 was located in the network 501 and operating in a network communications mode or from another source (e.g., mobile tag 201 paired with a communication device such as a smartphone that can communicate with a server of the network 501 via a cellular network or other communication means). In another embodiment, the mobile tag 201 can be configured to receive one or more messages from one or more anchors 204 transmitting its location in the network 501, which the mobile tag 201 can then compare to the look-up table (or database) to determine if it is in a location that supports a safe transition to a network communications mode. In another embodiment, the mobile tag 201 may receive one or more messages from one or more anchors 204 in the network 501 during the CFP period, which the mobile tag 201 can use to determine if it is able to transition to a network communications mode based on the number of messages and/or quality of the received messages from anchors 204 in the network 501 during the CFP period. For example, the quality of messages can be determined from a number of consecutive received messages exceeding a signal strength threshold. Such measurements can enable a mobile tag 201 to determine if there is sufficient (or insufficient) coverage in the network 501 of anchors 204 to transition from peer-to-peer communications to network communications or remain in peer-to-peer communications but operate in the mode shown in FIG. 13.

If the mobile tag 201 detects at step 610 that there is insufficient coverage in the network 501 relative to its current location to transition to a network communications mode, then the mobile tag 201 can proceed to step 612 where the mobile tag 201 can transition from a peer-to-peer communications mode as depicted in FIG. 12 to an adjusted peer-to-peer communications mode as shown in FIG. 13 (or maintain this adjusted communications mode if the mobile tag 201 had already previously implemented step 612). Alternatively, if the mobile tag 201 detects at step 610 that there is sufficient coverage to transition to a network communications mode, the mobile tag 201 can transition from a peer-to-peer communications mode as depicted in FIG. 12 to a network communications mode depicted by FIG. 11 where it performs ranging measurements exclusively with the assistance of anchors 204 of the network 501.

Once the transition from a peer-to-peer communications mode to a network communications mode occurs at step 614, the mobile tag 201 can be configured to monitor a lack of a presence of a beacon signal generated by the anchors 204 of the network 501. If the number of instances where the mobile tag 201 detects a lack of a beacon signal satisfies a threshold (greater than 2 consecutive lost beacon signals), the mobile tag 201 can transition to step 618 where it transitions from a network communications mode as depicted in FIG. 11 to a peer-to-peer communications mode as depicted by FIG. 12, and begins to monitor at step 602 for a presence of a beacon signal to transition back to the network communications mode once the instances of beacon signals satisfies the threshold of step 606 as previously described. If no lost beacon signals are detected at step 616, the mobile tag 201 can proceed to step 610 to determine if there's sufficient coverage to remain in the network communications mode at step 614. If the mobile tag 201 determines at step 616 that there is insufficient coverage, then the mobile tag 201 can proceed to step 612 and perform peer-to-peer communication as previously described above.

While for purposes of simplicity of explanation, the respective processes are shown and described as a series of blocks in FIG. 17, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 18A:
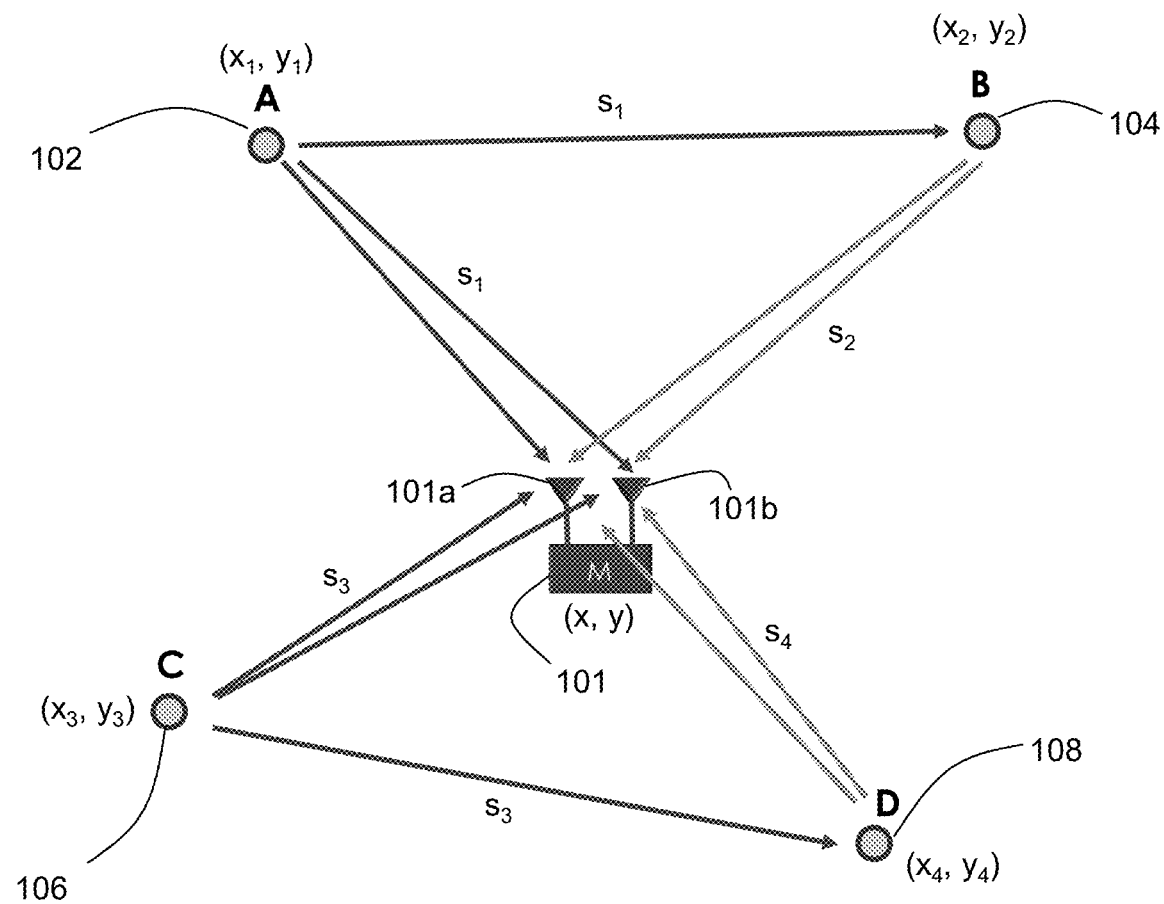
FIG. 18A is a block diagram illustrating an exemplary, non-limiting embodiment for determining location information between a mobile tag and pairs of anchors in accordance with various aspects described herein.

Exemplary embodiments, described herein, provide a system and method for determining the location of a mobile tag based on TDOA and AOA information (e.g., a combination of TDOA and AOA information). FIG. 18A is a block diagram illustrating an exemplary, non-limiting embodiment of a system 700 that includes the mobile tag 101 ("M") and the anchors 102 ("A"), 104 ("B"), 106 ("C"), and 108 ("D") (e.g., described above in relation to FIGS. 1-3 and 4A-4C) for determining the location of the mobile tag 101—e.g., relative to one or more of the anchors 102, 104, 106, and 108. System 700 can include any number of mobile tags and anchors, and thus the mobile tag and anchors shown in FIG. 18A is for illustrative purposes only. For example, system 700 may include more mobile tags and/or more or fewer anchors.

Figure 18B:
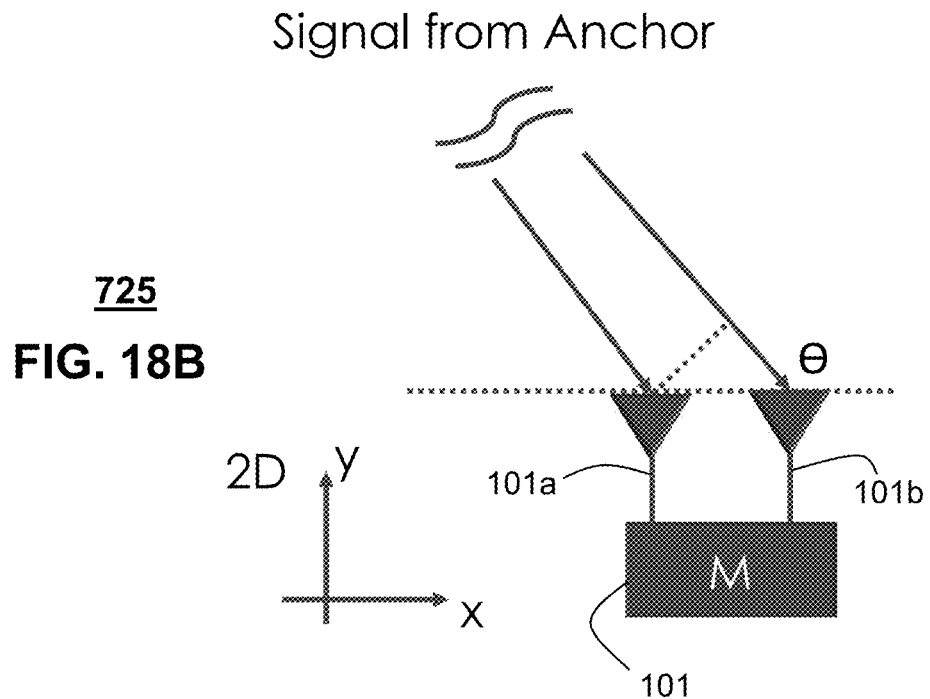
FIG. 18B is a block diagram illustrating an exemplary, non-limiting embodiment of a mobile tag having two antennas for facilitating determining of location information of the mobile tag in accordance with various aspects described herein.

As shown in FIG. 18A, the mobile tag 101 may include two antennas—e.g., an antenna 101a and an antenna 101b. In some embodiments, the mobile tag 101 may include additional antennas, such as three antennas (e.g., as depicted in FIG. 18B and described in more detail below) or more. In certain embodiments, the antennas may be included in an antenna array.

The antennas 101a and 101b may be configured to transmit and receive wireless signals (or packets) at a certain frequency or frequency range. In certain embodiments, the antennas 101a and 101b may be spatially distributed, or spaced apart from one another, on the mobile tag 101 by a distance of less than or equal to half of the wavelength ($\lambda/2$) of the wireless signal frequency.

Although not shown, the antennas 101a and 101b may be communicatively coupled to a processing unit (e.g., a radio frequency (RF) front-end or the like). In some embodiments, the antennas 101a and 101b may be communicatively coupled to a single or common processing unit. In certain embodiments, the antennas 101a and 101b may be communicatively coupled to different processing units (where, for example, clocks of the processing units may or may not be synchronized).

As depicted in FIG. 18A, each of the antennas 101a and 101b can be configured to receive wireless signals transmitted by the anchors 102 and 104 (e.g., a first pair of anchors), such as the first and second wireless signals ($s_1$, $s_2$) described above in relation to FIGS. 1 and 2, as well as wireless signals transmitted by one or more other anchors or pairs of anchors, such as third and fourth wireless signals ($s_3$, $s_4$) transmitted by the anchors 106 and 108 (e.g., a second pair of anchors). In various embodiments, such as in a case where (e.g., only) a single pair of anchors in system 700, such as anchors 102, 104, is selected to transmit wireless signals (e.g., wireless signals ($s_1$, $s_2$)) for purposes of estimating a present location of the mobile tag 101, the antennas 101a and 101b may receive wireless signals from (e.g., only) that pair of anchors.

By virtue of the different positions of antennas 101a and 101b on the mobile tag 101, the antennas may receive a given wireless signal from an anchor at (e.g., slightly) different times. This is depicted in FIG. 18A as two arrows representing a different line-of-sight (LOS) for each of the first, second, third, and fourth wireless signals ($s_1$, $s_2$, $s_3$, $s_4$). In a case where the antennas 101a and 101b are spaced apart by a short distance, such as less than or equal to half of the wavelength ($\lambda/2$) of the wireless signal frequency, information regarding a direction of an incoming wireless signal, such as an angle of arrival (AOA) of the wireless signal can be estimated or calculated. In exemplary embodiments, and as described in more detail below, AOA information can be further leveraged to determine or estimate a location of the mobile tag 101.

Figure 18C:
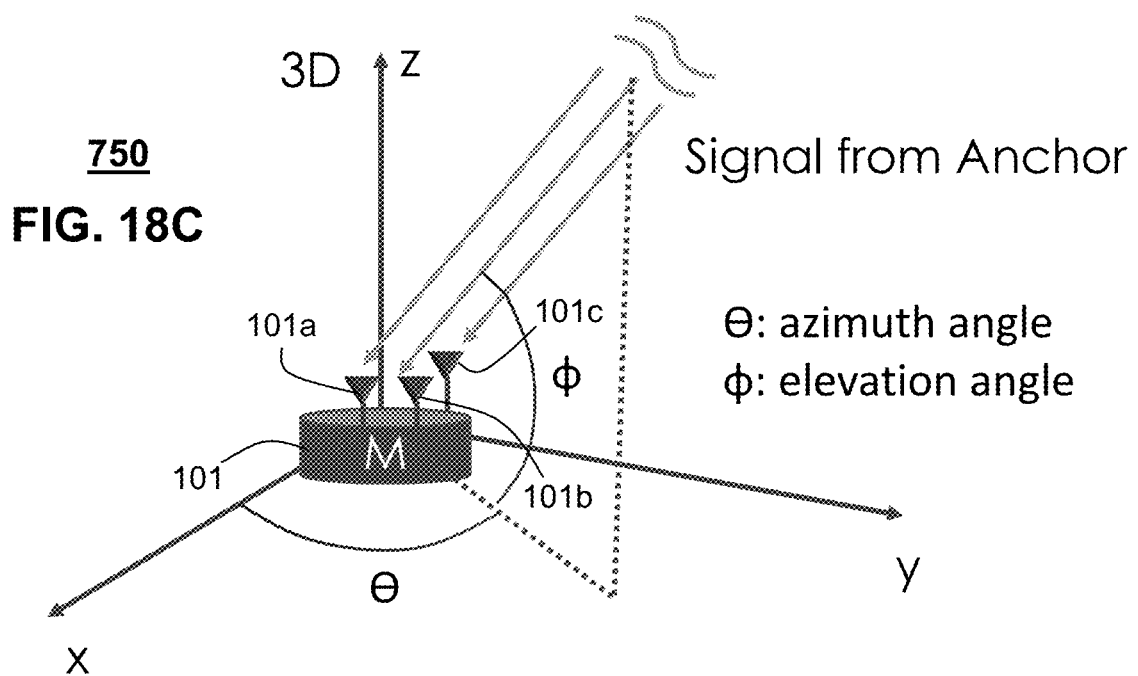
FIG. 18C is a block diagram illustrating an exemplary, non-limiting embodiment of a mobile tag having three antennas for facilitating determining of location information of the mobile tag in accordance with various aspects described herein.

FIGS. 18B and 18C show example block diagrams of the mobile tag 101 configured with two antennas (block diagram 725) and three antennas (block diagram 750), respectively. As shown in FIG. 18B, a wireless signal, transmitted by an anchor, may be received at each of the two antennas 101a, 101b of the mobile tag 101, which can enable estimation of an AOA of the wireless signal in two-dimensional (2D) space (e.g., an azimuth angle $\theta$ in the x-y plane). For a mobile tag 101 that is configured with three or more antennas (e.g., as depicted in FIG. 18C), a wireless signal, transmitted by an anchor, may be received at each of the three antennas 101a, 101b, 101c, which can enable estimation of additional AOA information—e.g., both an azimuth angle $\theta$ (in the x-y plane) and an elevation angle $\phi$ (with respect to (e.g., above) the x-y plane).

The AOA of a wireless signal transmitted by an anchor, and received by each of multiple antennas of the mobile tag 101, can be estimated or determined using any suitable technique. For example, estimation of AOA can be performed using beamforming approaches (e.g., the Bartlett method, the Minimum variance distortionless response (MVDR) beamformer solution, linear prediction, and/or the like), subspace-based approaches (e.g., MUltiple SIgnal Classification (MUSIC) and/or variants thereof, Estimation of Signal Parameters via Rotational Invariant Techniques (ESPRIT), and/or the like), maximum likelihood estimation, etc.

In various embodiments, AOA information (e.g., azimuth angle $\theta$ and/or elevation angle $\phi$) for a given anchor, can be estimated or determined individually—that is, where the azimuth angle $\theta$ (and/or the elevation angle $\phi$) is estimated using only wireless signal information for that anchor. In some embodiments, AOA information (e.g., azimuth angle $\theta$ and/or elevation angle $\phi$) for each of multiple anchors, can be jointly estimated or determined—that is, where, for example, AOA estimation technique(s) are applied to a combination of the wireless signal information for the multiple anchors, to arrive at individual AOA information (e.g., individual azimuth angle $\theta$ and/or elevation angle $\phi$) for each of the multiple anchors.

As briefly described above with respect to FIG. 18A, estimated AOA information (azimuth angle $\theta$ and/or elevation angle $\phi$) can be leveraged to determine a location of the mobile tag 101. This is possible based on geometric relationships that exist between the location of the mobile tag 101 and the azimuth angle $\theta$ and/or the elevation angle $\phi$).

In a case where the mobile tag 101 includes two antennas (e.g., as depicted in FIG. 18B), and using the first and second wireless signals ($s_1$, $s_2$) (transmitted by the pair of anchors 102, 104) as an example, the relationship between azimuth angle $\theta$ of the first wireless signal ($s_1$) (e.g., azimuth angle $\theta_1$ and the locations of the anchor 102 and the mobile tag 101 in 2D space can be represented as $$\tan\theta_1 = \frac{y_1 - y}{x_1 - x}, \quad \text{(EQ 14)}$$

where $\theta_1$, $x_1$, and $y_1$ may be known, and the relationship between azimuth angle $\theta$ of the second wireless signal ($s_2$) (e.g., azimuth angle $\theta_2$) and the locations of the anchor 104 and the mobile tag 101 in 2D space can be similarly represented as $$\tan\theta_2 = \frac{y_2 - y}{x_2 - x}, \quad \text{(EQ 15)}$$

where $\theta_2$, $x_2$, and $y_2$ may be known.

In a case where the mobile tag 101 includes three or more antennas (e.g., as depicted in FIG. 18C), and using the first and second wireless signals ($s_1$, $s_2$) (transmitted by the pair of anchors 102, 104) as another example, both of EQs 14 and 15 may apply for the respective azimuth angles $\theta_1$ and $\theta_2$ of the first and second wireless signals ($s_1$, $s_2$), and additional mathematical relationships may exist for the elevation angle $\phi$ for each of the first and second wireless signals ($s_1$, $s_2$). For example, the relationship between an elevation angle $\phi_1$ for the first wireless signal ($s_1$) and the locations of the anchor 102 and the mobile tag 101 in three-dimensional (3D) space can be represented as $$\tan\phi_1 = \frac{z_1 - z}{\sqrt{(x - x_1)^2 + (y - y_1)^2}}, \quad \text{(EQ 16)}$$

where $\phi_1$, $x_1$, $y_1$, and $z_1$ may be known, and the relationship between an elevation angle $\phi_2$ for the second wireless signal ($s_2$) and the locations of the anchor 104 and the mobile tag 101 in 3D space can be similarly represented as $$\tan\phi_2 = \frac{z_2 - z}{\sqrt{(x - x_2)^2 + (y - y_2)^2}}, \quad \text{(EQ 17)}$$

where $\phi_2$, $x_2$, $y_2$, and $z_2$ may be known.

As described above with respect to FIGS. 1 and 2, a (e.g., downlink) TDOA measurement technique can be used to determine a location of the mobile tag 101. In particular, location data relating to a pair of anchors (e.g., the pair of anchors 102 and 104) and receipt, by the mobile tag 101, of wireless signals transmitted from the anchors (e.g., the first and second wireless signals ($s_1$, $s_2$)), can be mathematically represented by EQs 4C, 5, and 6 above. Substituting a 3D version of $\Delta d_1$ in EQ 6 with $c(t_4-t_1-\Delta t)-d_{AB}$ (where the location ($x_1$, $y_1$, $z_1$) of anchor 102 and the location ($x_2$, $y_2$, $z_2$) of anchor 104 may be known) results in $$c(t_4-t_1\Delta t)=\sqrt{(x-x_2)^2+(y-y_2)+(z-z_2)^2}-\sqrt{(x-x_1)^2+(y-y_1)+(z-z_1)^2}+d_{AB} \quad (EQ\ 18).$$

In exemplary embodiments, a location of the mobile tag 101 can be determined based on a combination of both TDOA information and AOA information. Stated differently, the geometric relationships between the AOA information and the location of the mobile tag 101 can be combined with TDOA information to jointly estimate the location of the mobile tag 101. In various embodiments, the combination can be implemented by solving a system of equations that includes the relevant equations defined above.

As an example, in a case where the mobile tag 101 includes two antennas, as depicted in FIG. 18B, the system of equations can include EQs 14, 15, and 18 above. In this example, distance measurements may be performed in 3D space, a height z (in EQ 18) of the mobile tag 101 may be known, and solving EQs 14, 15, and 18 above can yield a location (x, y) of the mobile tag 101.

As another example, in a case where the mobile tag 101 includes three antennas, as depicted in FIG. 18C, the system of equations can include EQs 14, 15, 16, 17, and 18 above. In this example, a height z of the mobile tag 101 may be unknown, and solving EQs 14, 15, 16, 17, and 18 above can yield a location (x, y, z) of the mobile tag 101.

The systems of equations (e.g., the system of EQs 14, 15, and 18 and the system of EQs 14, 15, 16, 17, and 18) can be solved in any suitable manner. For example, each system of equations can be solved by utilizing nonlinear least-squares, weighted least squares, Kalman filtering, and/or the like.

It is to be appreciated and understood that EQs 14, 15, 16, and 17 above are provided only as examples. Other equations (e.g., trigonometric formulas) that represent the same or similar geometric relationships between the mobile tag 101 and the anchors 102 and 104 can be used. For example, in a case where the mobile tag 101 includes two antennas (as depicted in FIG. 18B), trigonometric formulas other than those based on the tangent function (i.e., EQs 14 and 15) can be used to define the relationships between the azimuth angle $\theta$ and the (x, y) coordinate. As another example, in a case where the mobile tag 101 includes three antennas (as depicted in FIG. 18C), trigonometric formulas other than those based on the tangent function (i.e., EQs 14, 15, 16, and 17) can be used to define the relationships between the azimuth angle $\theta$ the elevation angle $\phi$, and the (x, y, z) coordinate.

Combining TDOA information and AOA information to estimate the location of a mobile tag (such as the mobile tag 101), as described above, can provide improved (or optimized) accuracy as compared to estimating the location using only TDOA information.

In some embodiments, additional anchor pairs may be employed to further aid in the estimation of the location of the mobile tag. For example, in a case where the mobile tag 101 includes two antennas (as depicted in FIG. 18B), and where a second pair of anchors (e.g., anchors 106 and 108) transmits wireless signals (e.g., wireless signals $s_3$ and $s_4$) to the mobile tag 101, an additional set of equations, similar to EQs 14, 15, and 18, may be defined for the geometric and time-based relationships between the anchors 106, 108 and the mobile tag 101. This additional set of equations may, along with EQs 14, 15, 18 (relating to anchors 102, 104), be solved—e.g., using nonlinear least-squares, weighted least squares, Kalman filtering, and/or the like—to arrive at an estimated location (x, y) of the mobile tag 101. It is worth noting, however, that the improved accuracy of the estimated location of the mobile tag 101 provided by employing the above-described combination of TDOA information and AOA information for a single pair of anchors (e.g., just anchors 102 and 104), may obviate a need to utilize multiple anchor pairs for a particular location estimation. That is, for purposes of determining a present location of a mobile tag (e.g., the mobile tag 101), wireless signals from other anchor pairs, such as anchors 106, 108, may not be necessary. This reduces or eliminates a need to provide vast coverage for a mobile tag, such as may otherwise be required if only TDOA information is used to estimate the location of the mobile tag (e.g., using only TDOA information to estimate the location of a mobile tag may require the use of at least three pairs of anchors, as described above in relation to FIGS. 1-3 and 4A-4C). Less restrictive (or less stringent) coverage requirements decreases the quantity of anchors that need to be involved for any given mobile tag location estimation, and thus allows for more efficient scheduling of anchor pairs. This can reduce the quantity of wireless signals being transmitted and received across a network of anchors and mobile tags, which conserves computing resources, power resources, and network resources, and also improves overall network performance.

Furthermore, obtaining AOA information (e.g., as described above with respect to FIGS. 18A-18C) for a mobile tag can further facilitate collision mitigation between the mobile tag and other mobile tags. For example, in some embodiments, the mobile tag 101 can provide, to a second mobile tag (e.g., as part of peer-to-peer communications described above in relation to FIG. 12), AOA information estimated based on wireless signals received from anchors 102 and 104. In this example, the second mobile tag may utilize this information to determine a direction of the mobile tag 101 relative to the second mobile tag, and may, in conjunction with distance and/or speed measurements relating to the mobile tag 101 and the second mobile tag, determine whether there is any risk of collision with the mobile tag 101.

Figure 19:
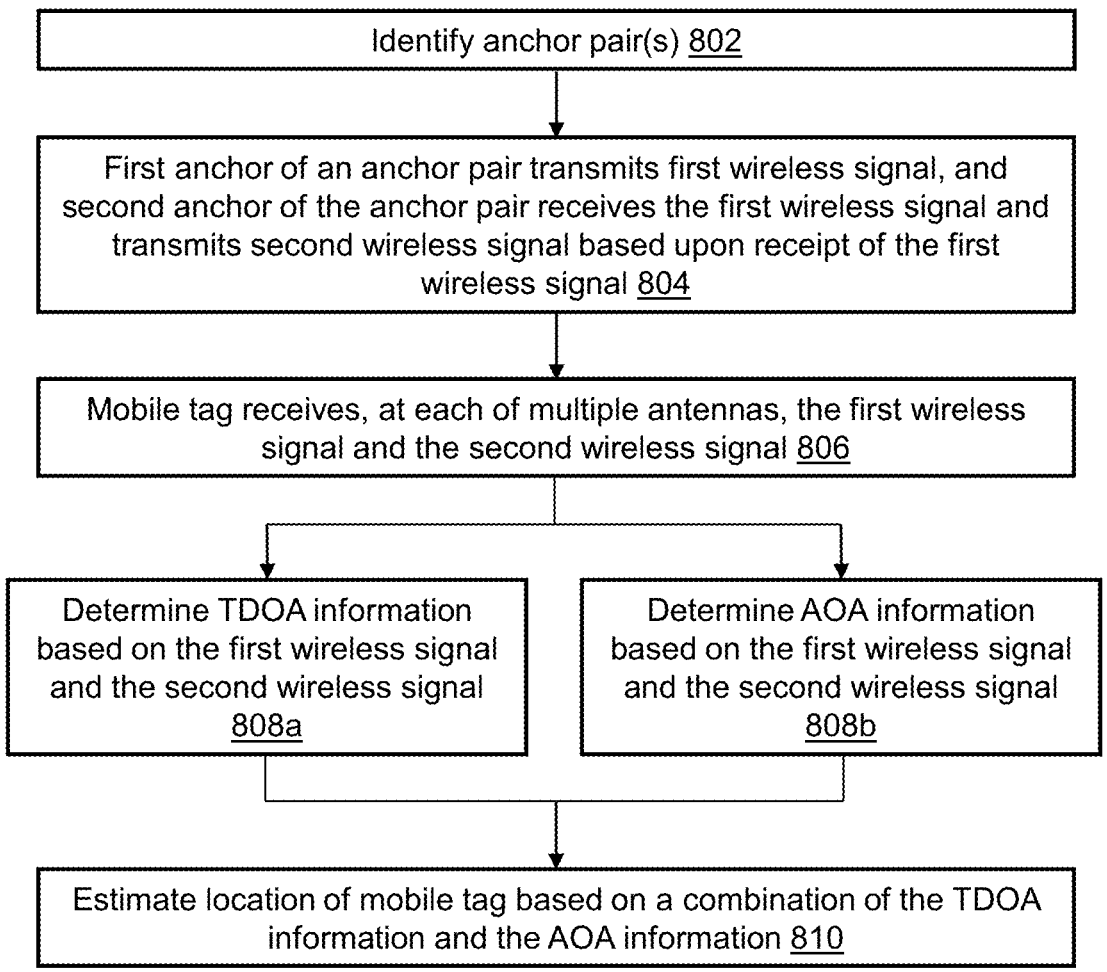
FIG. 19 depicts an illustrative embodiment of a method for determining location information in accordance with various aspects described herein.

FIG. 19 depicts an illustrative embodiment of a method 800 in accordance with various aspects described herein. Method 800 can begin at step 802, where anchor pair(s) (e.g., anchor pair 102, 104 of FIG. 18A), in a network of anchors, are identified. In various embodiments, anchors pairs may be identified in a manner similar to that described above with respect to step 302 of FIG. 8. Anchors of an anchor pair (e.g., anchor pair 102, 104) may be within communication range with one another, where an overlapping coverage region thereof may encompass the two anchors and a mobile tag (e.g., the mobile tag 101 or 201). In various embodiments, and as described above with respect to step 304 of FIG. 8, the anchor pair may transmit wireless signals in accordance with a transmission schedule to avoid signal collisions.

At step 804 of method 800, a first anchor of the anchor pair may transmit a first wireless signal, where a second anchor of the anchor pair may receive the first wireless signal and transmit a second wireless signal based upon receipt of the first wireless signal. For example, anchor pair 102 may transmit the first wireless signal $s_1$, where the anchor pair 104 may receive the first wireless signal $s_1$ and transmit the second wireless signal $s_2$ based upon receipt of the first wireless signal $s_1$, as described above with respect to FIGS. 1, 2, and 18A.

At step 806, the mobile tag may receive, at multiple antennas, the first wireless signal and the second wireless signal. For example, an embodiment of the mobile tag 101 that includes two antennas 101a and 101b (e.g., as described above with respect to FIG. 18B) may receive, at each of the two antennas 101a and 101b, the first wireless signal $s_1$ and the second wireless signal $s_2$. As another example, an embodiment of the mobile tag 101 that includes three or more antennas 101a, 101b, 101c (e.g., as described above with respect to FIG. 18C) may receive, at each of the three or more antennas 101a, 101b, 101c, the first wireless signal $s_1$ and the second wireless signal $s_2$.

At step 808a, the mobile tag may determine TDOA information based on the first and second wireless signals. For example, the mobile tag 101 may determine TDOA information based on the first wireless signal $s_1$ and the second wireless signal $s_2$—e.g., in a manner similar to that described above with respect to FIGS. 18A-18C, such as by using EQ 18. Alternatively, the mobile tag may provide, to an external position estimator device (e.g., the server described above with respect to FIG. 8), information relating to the first and second wireless signals, which the server may use to determine the TDOA information.

Independently (e.g., in parallel with step 808a), at step 808b, the mobile tag may determine AOA information based on the first and second wireless signals. For example, the mobile tag 101 may determine AOA information based on the first wireless signal $s_1$ and the second wireless signal $s_2$—e.g., in a manner similar to that described above with respect to FIGS. 18A-18C, such as by using beamforming approaches, subspace-based approaches, maximum likelihood estimation, etc. In various embodiments, the mobile tag may estimate AOA information for each anchor of the anchor pair. For example, the mobile tag 101 may estimate AOA information for anchor 102 based upon receipt of the first wireless signal $s_1$ at each of multiple antennas, and may estimate AOA information for anchor 104 based upon receipt of the second wireless signal $s_2$ at each of the multiple antennas. In some embodiments, the mobile tag may provide, to the external position estimator device (e.g., the server described above with respect to FIG. 8), information relating to the first and second wireless signals, which the server may use to determine the AOA information.

At step 810, the location of the mobile tag may be estimated (e.g., jointly estimated) based on a combination of the TDOA information and geometric relationships between the AOA information and the location of the mobile tag. For example, the mobile tag 101, or the external position estimator device, may estimate the location of the mobile tag 101 based on a combination of the TDOA information and geometric relationships between the AOA information and the location of the mobile tag 101—e.g., by solving a system of equations that includes EQs 14, 15, and 18 (in a case where the mobile tag 101 includes two antennas) or by solving a system of equations that includes EQs 14, 15, 16, 17, and 18 (in a case where the mobile tag 101 includes three or more antennas).

While for purposes of simplicity of explanation, the respective processes are shown and described as a series of blocks in FIG. 19, it is to be understood and appreciated that the claimed subject matter is not limited by the order of the blocks, as some blocks may occur in different orders and/or concurrently with other blocks from what is depicted and described herein. For example, in some embodiments, step 808a may alternatively be performed prior to step 808b or vice versa. Moreover, not all illustrated blocks may be required to implement the methods described herein.

One or more aspects of the subject disclosure include a system. The system may include a network of anchors (e.g., each at a known location (e.g., known x, y, z-based coordinate)). Each anchor of the network of anchors may include a respective processor and a respective transceiver for sending and receiving wireless signals (e.g., packets). The network of anchors may include a pair of anchors located within a communication range of one another. A first anchor of the pair of anchors may be configured to transmit a first wireless signal (e.g., a request (REQ) packet or the like) and a second anchor of the pair of anchors may be configured to receive the first wireless signal and to transmit a second wireless signal (e.g., a response (RSP) packet or the like) based on, or in response to, receiving the first wireless signal. The system may further include a mobile device (e.g., at an unknown location) having a plurality of antennas. An overlapping coverage area associated with the pair of anchors may encompass the mobile device. The mobile device may include a processor and a receiver for receiving, from the plurality of antennas, the first wireless signal and the second wireless signal, and may determine (e.g., using the processor of the mobile device), based on receiving the first wireless signal and the second wireless signal from the plurality of antennas (e.g., based on the REQ and RSP packets received by all of the antennas), time difference of arrival information and angle of arrival information relating to the first wireless signal and the second wireless signal to enable a location of the mobile device to be estimated.

In various embodiments, a distance between a first antenna of the plurality of antennas and a second antenna of the plurality of antennas may be less than half of a wavelength of the first wireless signal or the second wireless signal. In some embodiments, the mobile device may be configured to estimate the location of the mobile device based on the time difference of arrival information and the angle of arrival information relating to the first wireless signal and the second wireless signal.

In certain embodiments, the mobile device may not determine the time difference of arrival information and angle of arrival information, or may determine the time difference of arrival information and angle of arrival information, but may not estimate the location of the mobile device. In such embodiments, the system may further include a server device, and the mobile device may provide, to the server device, information/data relating to the receiving of the first wireless signal and the receiving of the second wireless signal, which the server device may use to determine the time difference of arrival information and the angle of arrival information and to estimate the location of the mobile device based thereon; or, alternatively, the mobile device may determine the time difference of arrival information and angle of arrival information and may provide the time difference of arrival information and angle of arrival information to the server device, which the server device may use to estimate the location of the mobile device.

In one or more embodiments, the first anchor may be configured to transmit the first wireless signal and the second anchor may be configured to transmit the second wireless signal in accordance with a transmission schedule, such that signal collisions are avoided.

One or more aspects of the subject disclosure include a mobile device. The mobile device can include a processing system having a processor. The mobile device can further include a first antenna, and a second antenna spaced apart from the first antenna. The mobile device can further include a memory that stores executable instructions that, when executed by the processing system, facilitate performance of operations. The operations can include receiving, from the first antenna and the second antenna, a first wireless signal transmitted by a first anchor of a first pair of anchors, and receiving, from the first antenna and the second antenna, a second wireless signal transmitted by a second anchor of the first pair of anchors, wherein the second wireless signal is transmitted by the second anchor based upon the second anchor detecting the first wireless signal. The operations can further include determining time difference of arrival information based on the receiving the first wireless signal and the receiving the second wireless signal, determining angle of arrival information based on the receiving the first wireless signal and the receiving the second wireless signal, and estimating a location of the mobile device based on the time difference of arrival information and the angle of arrival information.

One or more aspects of the subject disclosure include a non-transitory machine-readable medium comprising executable instructions that, when executed by a processing system of a mobile device including a processor, facilitate performance of operations. The operations can include receiving, from multiple antennas of the mobile device, a first wireless signal transmitted by a first anchor of a pair of anchors, and receiving, from the multiple antennas of the mobile device, a second wireless signal transmitted by a second anchor of the pair of anchors, wherein the second wireless signal is transmitted based on the first wireless signal. The operations can further include providing, to a server device, data relating to the receiving of the first wireless signal and the receiving of the second wireless signal to enable the server device to determine time difference of arrival information based on the data, derive angle of arrival information based on the data, and estimate a location of the mobile device based on the time difference of arrival information and the angle of arrival information.

Figure 20:
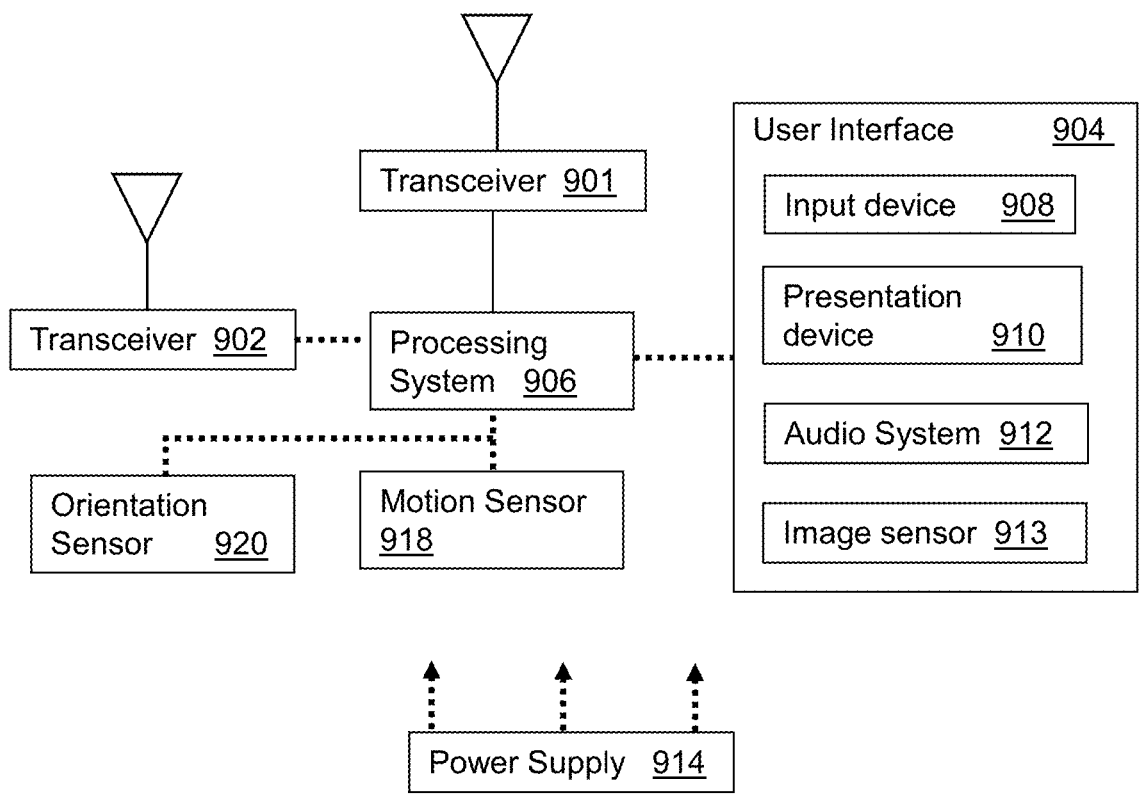
FIG. 20 is a block diagram of an example, non-limiting embodiment of a communication device in accordance with various aspects described herein.

FIG. 20 is a block diagram of an example, non-limiting embodiments of a communication device 900 in accordance with various aspects described herein. Communication device 900 can serve in whole or in part as an illustrative embodiment of a mobile tag 101, 201 and an anchor 102, 104, 106, 108, 204 as depicted in FIGS. 1-7, and can be configured to perform in whole or in part portions of methods 300 and 600 of FIGS. 8 and 17.

In an embodiment, communication device 900 can comprise a first wireless transceivers 901, a user interface (UI) 904, a power supply 914, and a processing system 906 for managing operations of the communication device 900. In another embodiment, communication device 900 can further include a second wireless transceiver 902, a motion sensor 918, and an orientation sensor 920. The first wireless transceiver 901 can be configured to support wideband wireless signals such as ultra-wideband signals (e.g., 500 MHz) for performing precision measurements such as TDOA and TW-TOA as described above and can be further configured for exchanging messages (e.g., x-y coordinates, location flags, etc.).

The second wireless transceiver 902 can be configured to support wireless access technologies such as Bluetooth®, ZigBee®, or WiFi (Bluetooth® and ZigBee® are trademarks registered by the Bluetooth® Special Interest Group and the ZigBee® Alliance, respectively). The second wireless transceiver 902 can be utilized to conserve power and offload messaging between communication devices by utilizing narrow band signals such as Bluetooth®, ZigBee®, or WiFi, instead of ultra-wideband signals. One or both wireless transceivers 901, 902 can also be used for obtaining a strength indicator (RSSI). One or both wireless transceivers 901, 902 can also be equipped with multiple antennas and one or more phase detectors to determine angle of arrival of wireless signals and thereby an orientation of the communication device 900 (e.g., mobile tag 101) relative to another communication device 900 (e.g., anchor 204).

The UI 904 can include an input device 908 that provides at least one of one or more depressible buttons, a tactile keypad, a touch-sensitive keypad, or a navigation mechanism such as a roller ball, a joystick, or a navigation disk for manipulating operations of the communication device 900. The input device 908 can be an integral part of a housing assembly of the communication device 900 or an independent device operably coupled thereto by a tethered wireline interface (such as a USB cable) or a wireless interface supporting for example Bluetooth®. The UI 904 can further include a presentation device 910. The presentation device 910 can include a vibrator to generate haptic feedback, an LED (Light Emitting Diode) configurable by the processing system 906 to emit one or more colors, and/or a monochrome or color LCD (Liquid Crystal Display) or OLED (Organic LED) display configurable by the processing system to present alphanumeric characters, icons or other displayable objects.

The UI 904 can also include an audio system 912 that utilizes audio technology for conveying low volume audio (for proximity listening by a user) and/or high volume audio (for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images in a vicinity of the communication device 900. The camera can be used for performing facial recognition and user ID recognition that can be combined with embodiments of the subject disclosure.

The power supply 914 can utilize common power management technologies such as replaceable and rechargeable batteries, supply regulation technologies, and/or charging system technologies for supplying energy to the components of the communication device 900 to facilitate portable applications. Alternatively, or in combination, the charging system can utilize external power sources such as DC power supplied over a physical interface such as a USB port or other suitable tethering technologies.

The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (in degrees, minutes, or other suitable orientation metrics). In some embodiments, the orientation sensor 920 can replace a need for utilizing multiple antennas with the first and/or second wireless transceivers 901, 902 and a phase detector for performing angle of arrival measurements. In other embodiments, the function of the orientation sensor 920 can be combined with an angle of arrival measurement performed with multiple antennas with the first and/or second wireless transceivers 901, 902 and a phase detector.

The processing system 906 can utilize computing technologies such as a microprocessor, a digital signal processor (DSP), programmable gate arrays, application specific integrated circuits (ASICs), and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 20 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings.

The communication device 900 as described herein can operate with more or less of the circuit components shown in FIG. 20. These variant embodiments can be used in one or more embodiments of the subject disclosure.

Figure 21:
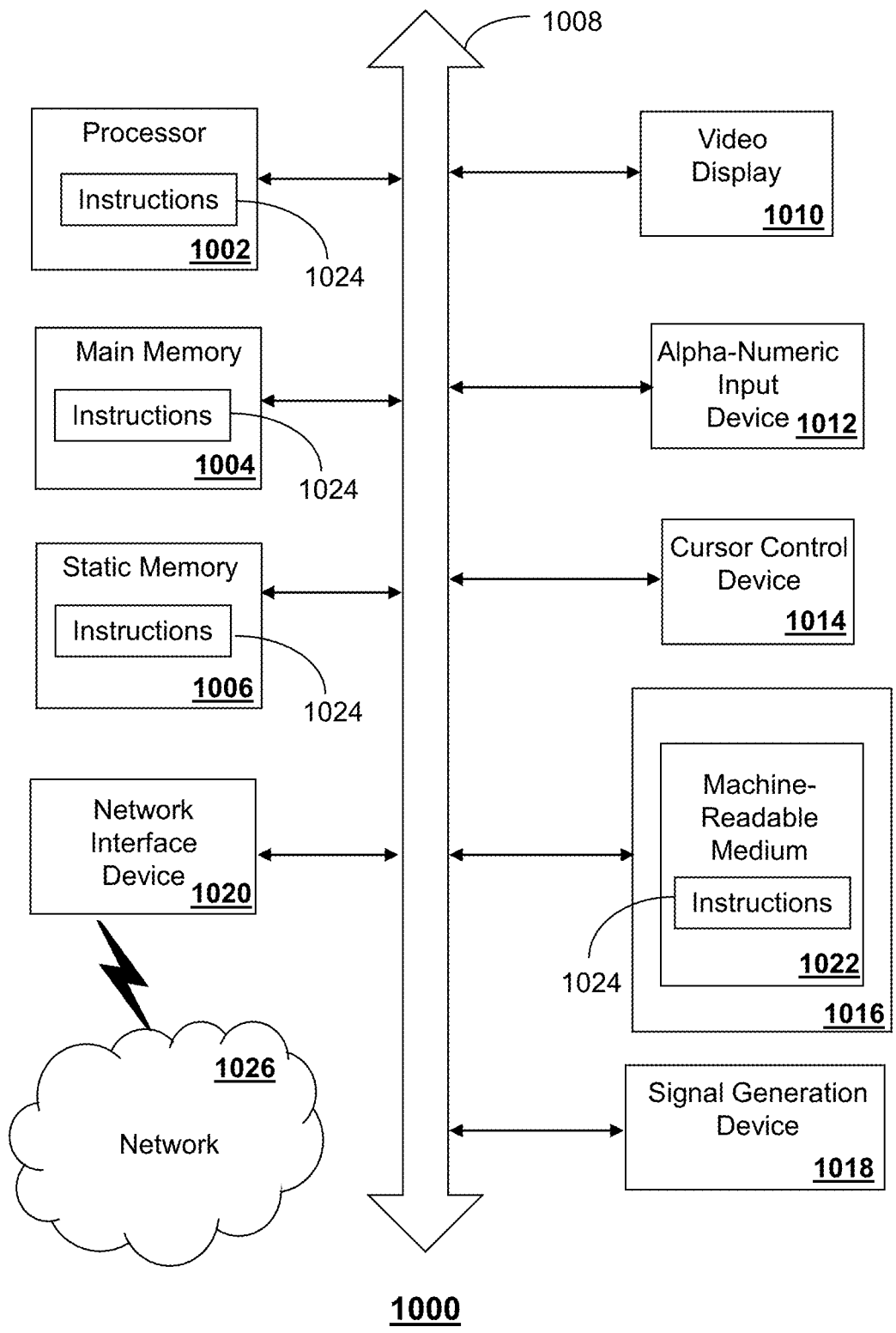
FIG. 21 is a block diagram of an example, non-limiting embodiment of a computing system in accordance with various aspects described herein.

FIG. 21 depicts an exemplary diagrammatic representation of a machine in the form of a computing system 1000 within which a set of instructions, when executed, may cause the machine to perform any one or more of the methods described above. One or more instances of the machine can operate, for example, as the computing system referred to in methods 300 or 600 of FIGS. 8 and 17. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides data communication. Further, while a single machine is illustrated, the term "machine" shall also be taken to include any collection of machines (physical or virtual machines) that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to:

solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A mobile device, comprising:
   a processing system including a processor;
   a first antenna;
   a second antenna spaced apart from the first antenna; and
   a memory that stores executable instructions that, when executed by the processing system, facilitate performance of operations, the operations comprising:
   receiving, from the first antenna and the second antenna, a first wireless signal transmitted by a first anchor of a first pair of anchors;
   receiving, from the first antenna and the second antenna, a second wireless signal transmitted by a second anchor of the first pair of anchors, wherein the second wireless signal is transmitted by the second anchor based upon the second anchor detecting the first wireless signal;
   determining time difference of arrival information based on the receiving the first wireless signal and the receiving the second wireless signal;
   determining angle of arrival information based on the receiving the first wireless signal and the receiving the second wireless signal; and
   estimating a location of the mobile device based on the time difference of arrival information and the angle of arrival information.

2. The mobile device of claim 1, wherein the estimating the location of the mobile device comprises performing a nonlinear least-squares (NLS) analysis using the time difference of arrival information and the angle of arrival information.

3. The mobile device of claim 1, wherein the first anchor and the second anchor are positioned at known locations and provide respective coverage areas such that an overlapping coverage area of the respective coverage areas encompasses the first anchor, the second anchor, and the mobile device.

4. The mobile device of claim 1, wherein a distance between the first antenna and the second antenna is less than or equal to half of a wavelength of the first wireless signal or the second wireless signal.

5. The mobile device of claim 1, wherein the determining the angle of arrival information comprises determining respective angle of arrival information for the first wireless signal and the second wireless signal.

6. The mobile device of claim 5, wherein the determining the respective angle of arrival information for the first wireless signal and the second wireless signal is based on a joint estimation using a combination of information relating to the first wireless signal and the second wireless signal.

7. The mobile device of claim 1, wherein the determining the angle of arrival information is based on a beamforming approach, a subspace-based approach, a maximum likelihood estimation, or a combination thereof.

8. The mobile device of claim 1, wherein the estimating the location of the mobile device comprises estimating the location of the mobile device in two-dimensional (2D) space.

9. The mobile device of claim 1, further comprising one or more additional antennas spaced apart from one another and from the first antenna and the second antenna, wherein the operations further comprise receiving, from each antenna of the one or more additional antennas, the first wireless signal and the second wireless signal, wherein the determining the time difference of arrival information is further based on the receiving the first wireless signal and the second wireless signal from each antenna of the one or more additional antennas, wherein the determining the angle of arrival information is further based on the receiving the first wireless signal and the second wireless signal from each antenna of the one or more additional antennas, and wherein the estimating the location of the mobile device comprises estimating the location of the mobile device in three-dimensional (3D) space.

10. The mobile device of claim 1, wherein the operations further comprise:
receiving, from the first antenna and the second antenna, respective wireless signals transmitted by corresponding anchors of one or more additional pairs of anchors;
determining, for each pair of anchors of the one or more additional pairs of anchors, additional time difference of arrival information based on the receiving the respective wireless signals transmitted by the corresponding anchors of that pair of anchors; and
determining, for each pair of anchors of the one or more additional pairs of anchors, additional angle of arrival information based on the receiving the respective wireless signals transmitted by the corresponding anchors of that pair of anchors, wherein the estimating the location of the mobile device is further based on the additional time difference of arrival information for each pair of anchors of the one or more additional pairs of anchors and the additional angle of arrival information for each pair of anchors of the one or more additional pairs of anchors.

11. The mobile device of claim 1, wherein the operations further comprise:
receiving, from the first antenna and the second antenna, respective wireless signals transmitted by corresponding anchors of one or more additional pairs of anchors; and
determining, for each pair of anchors of the one or more additional pairs of anchors, additional time difference of arrival information based on the receiving the respective wireless signals transmitted by the corresponding anchors of that pair of anchors, wherein the determining the angle of arrival information comprises determining respective angle of arrival information for the first anchor, the second anchor, and each anchor of each pair of anchors of the one or more additional pairs of anchors, by performing a joint estimation based on the receiving the first wireless signal, the receiving the second wireless signal, and the receiving the respective wireless signals transmitted by the corresponding anchors of the one or more additional pairs of anchors.

12. A system, comprising:
a network of anchors, wherein each anchor of the network of anchors comprises a respective transceiver for sending and receiving wireless signals, wherein the network of anchors includes a plurality of pairs of anchors, wherein anchors of each pair of anchors of the plurality of pairs of anchors are located within a communication range of one another, and wherein a first anchor of a first pair of anchors of the plurality of pairs of anchors is configured to transmit a first wireless signal, and a second anchor of the first pair of anchors is configured to receive the first wireless signal and to transmit a second wireless signal based on receiving the first wireless signal; and
a mobile device having a plurality of antennas, wherein an overlapping coverage area associated with the first pair of anchors encompasses the mobile device, and wherein the mobile device is configured to receive, from the plurality of antennas, the first wireless signal and the second wireless signal, and determine, based on receiving the first wireless signal and the second wireless signal from the plurality of antennas, time difference of arrival information and angle of arrival information relating to the first wireless signal and the second wireless signal to enable a location of the mobile device to be estimated.

13. The system of claim 12, wherein a distance between any two antennas of the plurality of antennas is less than half of a wavelength of the first wireless signal or the second wireless signal.

14. The system of claim 12, wherein the mobile device is configured to estimate the location of the mobile device based on the time difference of arrival information and the angle of arrival information relating to the first wireless signal and the second wireless signal.

15. The system of claim 12, further comprising a server device configured to obtain the time difference of arrival information and the angle of arrival information from the mobile device, and estimate the location of the mobile device responsive to obtaining the time difference of arrival information and the angle of arrival information.

16. The system of claim 12, wherein the first anchor is configured to transmit the first wireless signal and the second anchor is configured to transmit the second wireless signal in accordance with a transmission schedule, such that signal collisions are avoided.

17. A non-transitory machine-readable medium, comprising executable instructions that, when executed by a processing system of a mobile device including a processor, facilitate performance of operations, the operations comprising:

receiving, from multiple antennas of the mobile device, a first wireless signal transmitted by a first anchor of a pair of anchors;

receiving, from the multiple antennas of the mobile device, a second wireless signal transmitted by a second anchor of the pair of anchors, wherein the second wireless signal is transmitted based on the first wireless signal; and providing, to a server device, data relating to the receiving of the first wireless signal and the receiving of the second wireless signal to enable the server device to determine time difference of arrival information based on the data, derive angle of arrival information based on the data, and estimate a location of the mobile device based on the time difference of arrival information and the angle of arrival information.

18. The non-transitory machine-readable medium of claim 17, wherein the first wireless signal and the second wireless signal are transmitted at the same frequency.

19. The non-transitory machine-readable medium of claim 17, wherein the multiple antennas include at least two antennas, and wherein a distance between a first antenna of the at least two antennas and a second antenna of the at least two antennas is less than half of a wavelength of the first wireless signal or the second wireless signal.

20. The non-transitory machine-readable medium of claim 17, wherein the first anchor and the second anchor provide respective coverage areas such that an overlapping coverage area of the respective coverage areas encompasses the first anchor, the second anchor, and the mobile device.

* * * * *